(12) United States Patent
Patton

(10) Patent No.: US 8,308,562 B2
(45) Date of Patent: Nov. 13, 2012

(54) BIOFEEDBACK FOR A GAMING DEVICE, SUCH AS AN ELECTRONIC GAMING MACHINE (EGM)

(75) Inventor: Stephen Patton, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1233 days.

(21) Appl. No.: 12/111,760

(22) Filed: Apr. 29, 2008

(65) Prior Publication Data
US 2009/0270170 A1 Oct. 29, 2009

(51) Int. Cl.
  *A63F 9/24* (2006.01)
  *A63F 13/00* (2006.01)
  *G06F 17/00* (2006.01)
  *G06F 19/00* (2006.01)

(52) U.S. Cl. ............... 463/36; 463/40; 463/41; 463/42; 463/43; 434/128; 434/129; 600/300

(58) Field of Classification Search ............... 434/128, 434/129; 463/36, 40–43; 600/300
See application file for complete search history.

(56) References Cited

U.S. PATENT DOCUMENTS

| | | |
|---|---|---|
| 1,034,402 A | 7/1912 | Hardy |
| 1,361,202 A | 12/1920 | Thomas |
| 1,599,390 A | 9/1926 | Albert |
| 1,727,800 A | 9/1929 | Albert |
| 1,890,504 A | 12/1932 | Ferguson, Jr. |
| 2,567,223 A | 9/1951 | Maher et al. |
| 2,595,845 A | 5/1952 | Hagwell ............... 311/106 |
| 2,663,418 A | 12/1953 | Grunwald ............... 206/62 |
| 2,694,662 A | 11/1954 | Hunter, Jr. ............... 154/121 |
| 2,731,271 A | 1/1956 | Brown ............... 273/149 |
| 3,222,071 A | 12/1965 | Lang ............... 273/149 |
| 3,312,473 A | 4/1967 | Friedman et al. ............... 273/149 |
| 3,339,223 A | 9/1967 | Laby ............... 16/105 |

(Continued)

FOREIGN PATENT DOCUMENTS
JP 2005-066133 3/2005
(Continued)

OTHER PUBLICATIONS

Ward, K., "BJ Tracking System has Players Down for the Count," *Gaming Today*, Mar. 5, 2002, accessed Dec. 21, 2005, from Casino Software & Services, LLC, URL = http://www.casinosoftware.com/gaming_today.html.

(Continued)

*Primary Examiner* — David L Lewis
*Assistant Examiner* — Adetokunbo Torimiro
(74) *Attorney, Agent, or Firm* — Seed IP Law Group PLLC

(57) ABSTRACT

Environmental feedback and/or biofeedback is associated with one or more players' emotions in real time. The emotional feedback is provided to a game device being used by the player, such an electronic gaming machine (EGM). The game device uses the biofeedback and/or environmental feedback to appropriately adjust the game play to maximize the game's entertainment value to the player(s). The player(s) can be identified, and the game device matches the emotional response with certain game elements being presented at that time and associates this matching to the identified player. The matches can be used to make an adjustment to the game device, to the environments, and/or to take some other action. The game device can also store the matches, combined with any collected environmental and/or biometric stimuli, on a game server or player tracking database via the network.

44 Claims, 6 Drawing Sheets

U.S. PATENT DOCUMENTS

| | | | |
|---|---|---|---|
| 3,377,070 A | 4/1968 | Nottoli | 273/149 |
| 3,493,728 A | 2/1970 | Braden et al. | 235/61.11 |
| 3,561,756 A | 2/1971 | Barnett | 271/41 |
| 3,667,759 A | 6/1972 | Barr | 273/152.1 |
| 3,690,670 A | 9/1972 | Cassady et al. | 273/149 P |
| 3,735,982 A | 5/1973 | Gerfin | 273/1 E |
| 3,740,742 A | 6/1973 | Thompson et al. | 340/280 |
| 3,751,041 A | 8/1973 | Seifert | 273/149 P |
| 3,752,962 A | 8/1973 | Greskovics | 235/61.11 D |
| 3,766,452 A | 10/1973 | Burpee et al. | 317/262 R |
| 3,787,660 A | 1/1974 | Meyers et al. | 235/61.9 R |
| 3,810,172 A | 5/1974 | Burpee et al. | 343/5 PD |
| 3,814,436 A | 6/1974 | Boren | 273/149 P |
| 3,897,954 A | 8/1975 | Erickson et al. | 273/149 R |
| 3,907,282 A | 9/1975 | Hunter | 271/233 |
| 3,929,339 A | 12/1975 | Mattioli | 273/148 A |
| 3,937,311 A | 2/1976 | Gehrke | 192/45 |
| 3,937,312 A | 2/1976 | Gehrke | 192/45 |
| 3,942,616 A | 3/1976 | Elmore | 192/45 |
| 3,966,047 A | 6/1976 | Steiner | 209/75 |
| 3,972,573 A | 8/1976 | Marola | 308/217 |
| 3,990,555 A | 11/1976 | Carullo | 192/45 |
| 3,993,176 A | 11/1976 | Marola et al. | 192/45 |
| 3,993,177 A | 11/1976 | Gehrke | 192/45 |
| 3,994,377 A | 11/1976 | Elmore | 192/45 |
| 4,023,167 A | 5/1977 | Wahlstrom | 343/6.5 SS |
| 4,026,309 A | 5/1977 | Howard | 133/8 R |
| 4,031,376 A | 6/1977 | Corkin, Jr. | 235/156 |
| 4,095,795 A | 6/1978 | Saxton et al. | 273/143 R |
| 4,108,361 A | 8/1978 | Krause | 235/375 |
| 4,135,663 A | 1/1979 | Nojiri et al. | 235/463 |
| 4,241,921 A | 12/1980 | Miller | 273/148 A |
| 4,244,582 A | 1/1981 | Raees et al. | 273/293 |
| 4,264,074 A | 4/1981 | Sobajima | 273/149 R |
| 4,283,708 A | 8/1981 | Lee | 340/146.3 Z |
| 4,310,160 A | 1/1982 | Willette et al. | 273/149 R |
| 4,339,798 A | 7/1982 | Hedges et al. | 364/412 |
| 4,373,726 A | 2/1983 | Churchill et al. | 273/138 A |
| 4,377,285 A | 3/1983 | Kadlic | 273/148 A |
| 4,428,582 A | 1/1984 | Smith | 273/296 |
| 4,448,419 A | 5/1984 | Telnaes | 273/143 R |
| 4,457,512 A | 7/1984 | Stevenson | 273/148 A |
| 4,467,424 A | 8/1984 | Hedges et al. | 364/412 |
| 4,470,496 A | 9/1984 | Steiner | 194/4 C |
| 4,475,564 A | 10/1984 | Koester et al. | 133/8 R |
| 4,482,058 A | 11/1984 | Steiner | 209/534 |
| 4,497,488 A | 2/1985 | Plevyak et al. | 273/149 R |
| 4,503,963 A | 3/1985 | Steiner | 194/4 C |
| 4,510,490 A | 4/1985 | Anderson, III et al. | 340/572 |
| 4,512,580 A | 4/1985 | Matviak | 273/148 A |
| 4,517,558 A | 5/1985 | Davids | 340/700 |
| 4,517,654 A | 5/1985 | Carmean | 364/521 |
| 4,518,001 A | 5/1985 | Branham | 133/5 R |
| 4,531,117 A | 7/1985 | Nourse et al. | 340/572 |
| 4,531,187 A | 7/1985 | Uhland | 364/412 |
| 4,531,909 A | 7/1985 | Takeshita | 432/37 |
| 4,534,562 A | 8/1985 | Cuff et al. | 273/149 P |
| 4,574,824 A | 3/1986 | Paulsen et al. | 133/4 R |
| 4,586,712 A | 5/1986 | Lorber et al. | 273/149 R |
| 4,588,292 A | 5/1986 | Collins | 356/71 |
| 4,592,377 A | 6/1986 | Paulsen et al. | 133/5 R |
| 4,621,814 A | 11/1986 | Stepan et al. | 273/138 A |
| 4,635,937 A | 1/1987 | Dickinson et al. | 273/143 R |
| 4,636,846 A | 1/1987 | Villarreal | 358/100 |
| 4,636,896 A | 1/1987 | Takikawa | 360/105 |
| 4,650,057 A | 3/1987 | Koester | 194/346 |
| 4,656,463 A | 4/1987 | Anders et al. | 340/572 |
| 4,659,082 A | 4/1987 | Greenberg | 273/149 R |
| 4,660,025 A | 4/1987 | Humphrey | 340/572 |
| 4,660,833 A | 4/1987 | Dickinson et al. | 273/143 R |
| 4,662,637 A | 5/1987 | Pfeiffer | 273/149 P |
| 4,667,959 A | 5/1987 | Pfeiffer et al. | 273/149 R |
| 4,693,477 A | 9/1987 | Dickinson et al. | 273/143 R |
| 4,693,480 A | 9/1987 | Smith | 273/296 |
| 4,711,452 A | 12/1987 | Dickinson et al. | 273/143 R |
| 4,721,307 A | 1/1988 | Okada | 273/143 R |
| 4,725,079 A | 2/1988 | Koza et al. | 283/73 |
| 4,728,108 A | 3/1988 | Neuwahl | 273/296 |
| 4,746,830 A | 5/1988 | Holland | 310/313 D |
| 4,750,743 A | 6/1988 | Nicoletti | 273/148 A |
| 4,755,941 A | 7/1988 | Bacchi | 364/412 |
| 4,770,421 A | 9/1988 | Hoffman | 273/149 R |
| 4,802,218 A | 1/1989 | Wright et al. | 380/23 |
| 4,807,884 A | 2/1989 | Breeding | 273/149 R |
| 4,814,589 A | 3/1989 | Storch et al. | 235/375 |
| 4,817,528 A | 4/1989 | Baker | 101/395 |
| 4,822,050 A | 4/1989 | Normand et al. | 273/149 P |
| 4,832,341 A | 5/1989 | Muller et al. | 273/139 |
| 4,832,342 A | 5/1989 | Plevyak et al. | 273/149 R |
| 4,837,728 A | 6/1989 | Barrie et al. | 364/412 |
| 4,859,991 A | 8/1989 | Watkins et al. | 340/572 |
| 4,861,041 A | 8/1989 | Jones et al. | 273/292 |
| 4,870,391 A | 9/1989 | Cooper | 340/572 |
| 4,885,700 A | 12/1989 | Kondziolka et al. | 364/519 |
| 4,889,367 A | 12/1989 | Miller | 283/88 |
| 4,920,335 A | 4/1990 | Andrews | 340/572 |
| 4,926,996 A | 5/1990 | Eglise et al. | 194/212 |
| 4,948,138 A | 8/1990 | Pease et al. | 273/138 A |
| 4,951,950 A | 8/1990 | Normand et al. | 273/149 P |
| 4,969,648 A | 11/1990 | Hollinger et al. | 273/149 R |
| 4,973,851 A | 11/1990 | Lee | 250/556 |
| 4,978,322 A | 12/1990 | Paulsen | 453/57 |
| 4,995,615 A | 2/1991 | Cheng | 273/292 |
| 4,998,737 A | 3/1991 | Lamle | 273/296 |
| 5,000,453 A | 3/1991 | Stevens et al. | 273/149 R |
| 5,007,641 A | 4/1991 | Seidman | 273/138 A |
| 5,031,914 A | 7/1991 | Rosenthal | 273/146 |
| 5,039,102 A | 8/1991 | Miller | 273/148 R |
| 5,042,809 A | 8/1991 | Richardson | 273/138 A |
| 5,050,881 A | 9/1991 | Nagao | 273/143 R |
| 5,053,612 A | 10/1991 | Pielemeier et al. | 235/462 |
| 5,058,893 A | 10/1991 | Dickinson et al. | 273/143 R |
| 5,067,713 A | 11/1991 | Soules et al. | 273/149 P |
| 5,067,724 A | 11/1991 | Rinkavage | 273/292 |
| 5,067,725 A | 11/1991 | Leach | 273/302 |
| 5,083,800 A | 1/1992 | Lockton | 273/439 |
| 5,096,197 A | 3/1992 | Embury | 273/149 R |
| 5,100,137 A | 3/1992 | Fulton | 273/85 CP |
| 5,103,081 A | 4/1992 | Fisher et al. | 235/464 |
| 5,103,234 A | 4/1992 | Watkins et al. | 343/742 |
| 5,110,134 A | 5/1992 | Laughlin et al. | 273/293 |
| 5,114,153 A | 5/1992 | Rosenwinkel et al. | 273/292 |
| 5,121,921 A | 6/1992 | Friedman et al. | 273/149 P |
| 5,154,419 A | 10/1992 | Madhavan | 273/126 R |
| 5,156,397 A | 10/1992 | Valenza, Jr. | 273/138 A |
| 5,157,602 A | 10/1992 | Fields et al. | 364/412 |
| 5,166,502 A | 11/1992 | Rendleman et al. | 235/492 |
| 5,167,411 A | 12/1992 | Isobe | 271/273 |
| 5,167,413 A | 12/1992 | Fulton | 273/85 CP |
| 5,167,571 A | 12/1992 | Waller | 453/29 |
| 5,178,389 A | 1/1993 | Bentley et al. | 273/138 A |
| 5,179,517 A | 1/1993 | Sarbin et al. | 364/410 |
| 5,184,821 A | 2/1993 | Korenek | 273/138 A |
| 5,186,464 A | 2/1993 | Lamle | 273/149 R |
| 5,188,363 A | 2/1993 | Marnell, II et al. | 273/85 CP |
| 5,199,710 A | 4/1993 | Lamle | 273/149 R |
| 5,216,234 A | 6/1993 | Bell | 235/494 |
| 5,224,712 A | 7/1993 | Laughlin et al. | 273/304 |
| 5,240,140 A | 8/1993 | Huen | 221/13 |
| 5,242,041 A | 9/1993 | Isobe | 194/207 |
| 5,242,163 A | 9/1993 | Fulton | 273/85 CP |
| 5,248,142 A | 9/1993 | Breeding | 273/138 R |
| 5,251,897 A | 10/1993 | Fulton | 273/85 CP |
| 5,258,837 A | 11/1993 | Gormley | 358/140 |
| 5,259,907 A | 11/1993 | Soules et al. | 156/277 |
| 5,261,667 A | 11/1993 | Breeding | 273/149 R |
| 5,265,874 A | 11/1993 | Dickinson et al. | 273/138 A |
| 5,273,281 A | 12/1993 | Lovell | 273/138 R |
| 5,275,400 A | 1/1994 | Weingardt et al. | 273/85 CP |
| 5,275,411 A | 1/1994 | Breeding | 273/149 R |
| 5,283,422 A | 2/1994 | Storch et al. | 235/375 |
| 5,288,081 A | 2/1994 | Breeding | 273/292 |
| 5,303,921 A | 4/1994 | Breeding | 273/149 R |
| 5,312,104 A | 5/1994 | Miller | 273/148 R |
| 5,319,181 A | 6/1994 | Shellhammer et al. | 235/462 |
| 5,321,241 A | 6/1994 | Craine | 235/380 |
| 5,322,295 A | 6/1994 | Cabot et al. | 273/292 |

| | | | | |
|---|---|---|---|---|
| 5,324,035 A | 6/1994 | Morris et al. ............. 273/138 A |
| 5,326,104 A | 7/1994 | Pease et al. ............. 273/138 A |
| 5,332,219 A | 7/1994 | Marnell, II et al. ........ 273/138 A |
| 5,343,028 A | 8/1994 | Figarella et al. .............. 235/462 |
| 5,344,144 A | 9/1994 | Canon ....................... 273/138 A |
| 5,344,146 A | 9/1994 | Lee .......................... 273/149 R |
| 5,356,145 A | 10/1994 | Verschoor .................. 273/149 R |
| 5,361,885 A | 11/1994 | Modler ........................ 194/214 |
| 5,362,053 A | 11/1994 | Miller ....................... 273/148 R |
| 5,364,104 A | 11/1994 | Jones et al. ................... 273/292 |
| 5,374,061 A | 12/1994 | Albrecht ................... 273/149 R |
| 5,381,019 A | 1/1995 | Sato ........................... 250/556 |
| 5,382,024 A | 1/1995 | Blaha ....................... 273/149 R |
| 5,386,103 A | 1/1995 | DeBan et al. ................. 235/379 |
| 5,389,945 A | 2/1995 | Sheridon ........................ 345/85 |
| 5,639,088 A | 6/1997 | Schneider et al. ......... 273/138.2 |
| 6,302,793 B1 | 10/2001 | Fertitta, III et al. ............. 463/25 |
| 6,508,709 B1 * | 1/2003 | Karmarkar ..................... 463/42 |
| 6,712,695 B2 | 3/2004 | Mothwurf et al. .............. 463/25 |
| 7,329,185 B2 | 2/2008 | Conover et al. ................ 463/25 |
| 7,404,763 B2 | 7/2008 | Malone et al. .................. 463/13 |
| 7,534,169 B2 | 5/2009 | Amaitis et al. ................. 463/39 |
| 7,730,198 B2 | 6/2010 | Ruppert et al. .............. 709/230 |
| 7,753,789 B2 | 7/2010 | Walker et al. .................. 463/42 |
| 7,780,526 B2 | 8/2010 | Nguyen et al. ................. 463/29 |
| 7,780,529 B2 | 8/2010 | Rowe et al. .................... 463/42 |
| 7,862,425 B2 | 1/2011 | Cavagna ....................... 463/25 |
| 7,901,294 B2 | 3/2011 | Walker et al. .................. 463/42 |
| 7,937,464 B2 | 5/2011 | Ruppert et al. .............. 709/224 |
| 8,057,297 B2 | 11/2011 | Silvestro ....................... 463/25 |
| 2003/0232640 A1 | 12/2003 | Walker et al. |
| 2004/0002388 A1 | 1/2004 | Larsen et al. ................... 463/43 |
| 2004/0166940 A1 | 8/2004 | Rothschild ..................... 463/42 |
| 2004/0259630 A1 | 12/2004 | Huard et al. ................... 463/25 |
| 2005/0119052 A1 | 6/2005 | Russell et al. .................. 463/42 |
| 2005/0255911 A1 | 11/2005 | Nguyen et al. ................. 463/25 |
| 2005/0255922 A1 | 11/2005 | Nguyen et al. .................. 463/42 |
| 2006/0205461 A1 | 9/2006 | LaRocca et al. .................. 463/1 |
| 2006/0205484 A1 | 9/2006 | Nicastro ......................... 463/25 |
| 2007/0149282 A1 | 6/2007 | Lu et al. |
| 2007/0259709 A1 | 11/2007 | Kelly et al. ..................... 463/20 |
| 2008/0064501 A1 | 3/2008 | Patel .............................. 463/40 |
| 2008/0108433 A1 | 5/2008 | DiMichele et al. ............. 463/40 |
| 2008/0146892 A1 * | 6/2008 | LeBoeuf et al. ............. 600/300 |
| 2008/0275358 A1 * | 11/2008 | Freer et al. .................... 600/544 |
| 2008/0287197 A1 | 11/2008 | Ruppert et al. ................. 463/42 |
| 2009/0029775 A1 | 1/2009 | Ruppert et al. ................. 463/42 |
| 2009/0176558 A1 | 7/2009 | Englman et al. ............... 463/25 |
| 2009/0176580 A1 | 7/2009 | Herrmann et al. .............. 463/43 |
| 2009/0233710 A1 * | 9/2009 | Roberts .......................... 463/30 |
| 2009/0307069 A1 | 12/2009 | Meyerhofer |
| 2010/0048291 A1 | 2/2010 | Warkentin ...................... 463/25 |
| 2010/0130280 A1 | 5/2010 | Arezina et al. ................. 463/20 |
| 2010/0151926 A1 | 6/2010 | Ruppert et al. ................... 463/1 |
| 2010/0161798 A1 | 6/2010 | Ruppert et al. .............. 709/225 |

FOREIGN PATENT DOCUMENTS

JP   2007-130212   5/2007

OTHER PUBLICATIONS

Winkler, C., "Product Spotlight: MindPlay," reprinted from *Gaming and Leisure Technology*, Fall 2003, 2 pages.

International Search Report, mailed Nov. 27, 2009, for PCT/US2009/042145, 2 pages.

Written Opinion, mailed Nov. 27, 2009, for PCT/US2009/042145, 5 pages.

Written Opinion mailed Jun. 16, 2011 for co-pending Singapore Application No. 201007918-4, 8 pages.

* cited by examiner

BIOFEEDBACK FOR A GAMING DEVICE, SUCH AS AN ELECTRONIC GAMING MACHINE (EGM)

TECHNICAL FIELD

The present disclosure generally relates to gaming devices, and more particularly but not exclusively relates to providing player biofeedback for a gaming device, such as an electronic gaming machine (EGM).

BACKGROUND INFORMATION

There are numerous types of games that people play for entertainment, educational, or economic purposes. These games can include physical games (e.g., board games, mechanized slot machines, etc.), computer-controlled games (e.g., video gaming machines, XBOX consoles, etc.), or a games that include both physical elements and computer-controlled elements.

Computer-controlled games generally provide richer experiences to the participants. Such experiences can include coordinated multi-media experience, more challenging games, extended, multi-session gaming, virtual experiences that combine reality with fantasy, faster-than-normal experiences, more immersive experiences, and so forth.

Both physical and computer-controlled games generally involve an attempt by the player to achieve one or more goals. These goals for example can be multi-level and staged goals, in which the player progresses to the next stage or level as previous levels/stages are completed. These goals also can be increasingly more difficult or challenging, can involve the accumulation of points or credits, and/or can include multiple possible goals each with possibly different rewards and associated paths.

The games can also require dexterity or knowledge skills, or a combination of both, in order to achieve a goal. For example, a player may have to navigate virtual geographies, make decisions on courses of action (e.g., amount to wager, path to take, etc.). The decisions made by the player while playing can result in the selection by the game of a different path of execution and the adjustment of goals and/or rewards accordingly.

A game can also involve luck as determined ultimately by some type of random number generator in the gaming device, and/or can involve both skill and luck. A game can also increase in difficulty during the course of playing based on the skill/luck of the player, with the change in required skill level being responsive to continued success by the player in achieving goals from one game level to another. Such increase in game difficulty can be for the purposes of adjusting the game's real or perceived value to the player, "leveling" the playing field (handicapping), achieving parity across multiple players, maintaining certain reward levels (for example maintaining average hold percentages on a gaming machine per policy or regulation), and so forth.

A game can reward the player's accomplishment of goals in points, credits, prizes (such as cash), or some combination thereof, alternatively or additionally to the enjoyment felt by the player in achieving the goal(s). Rewards may be provided only for completely achieving a goal, or prorated for partially achieving a goal. A game can provide multiple goals, each having an associated reward.

Games can involve a single player that plays against the gaming device (such as against a virtual opponent) in order to achieve a goal, as well as involving multiple players that play against or with each other to achieve a goal. Examples of computer-controlled games that can involve single or multiple players include games that operate with a personal terminal or console (e.g., a video slot machine, XBOX, PSP, Nintendo DS, etc), games that are served remotely from a server (e.g., a server-based video slot machine, portal gaming machine, online web game, cable television set top box served by back-end servers, etc.), and/or games that include a mixture of hardware, software, and networking components that can be local or remote to the player.

The above-described and other features of games (e.g., requirements for skill/luck, attempts to achieve goals, rewards for achieving goals, and other aspects of the games and playing thereof) offer players an entertainment experience and/or other value desirable to the players. Players generally select games they wish to play based on their personal preferences of the value(s) that the game provides to them, whether entertainment, economic, social, or otherwise. Thus, the choice of which particular game to play and to continue playing is a highly individualistic choice for each player. What may provide a level of value to one player may not provide the same level of value to another player.

Game and content manufacturers, developers, providers, and suppliers have spent significant effort in creating games that attempt to maximize the value of the games for the player, through richer experiences, higher possibility of economic return (e.g., lower hold percentages on wagering machines), adjusting existing or developing new goals to make the game more mentally or physically challenging, etc. For example, in a wagering game environment (such as a casino), game models, mathematic models, video and cabinet graphics and skins, secondary/bonus games, and other entertainment components have been developed that players seem to enjoy. These development efforts often attempt to maximize the entertainment value in proportion to the economic value, and thus maximize the wagering revenues to the casino or other gaming venue operator.

However, there is limited flexibility that is built into these games to alter their course of play. From the results of the game during the course of playing the game, the game device can calculate the player's skill level and/or luck, and make adjustments to the game accordingly to attempt to maximize the entertainment value for the player. However, determining the entertainment value based on the game play is severely limiting, for instance since there is the underlying assumption that a player wants increased (or decreased) skill requirements and/or luck outcomes. This assumption does not necessarily hold true with certain players and in certain situations. Thus, the gaming device's adjustments to the game, which are based on the game play, amount to rather rough guesswork.

BRIEF SUMMARY

An aspect provides a method for a gaming device located in an environment, the method including: obtaining biofeedback that represents at least one biometric characteristic of a player of the gaming device; obtaining environmental feedback that represents at least one stimulus present in the environment; processing both of the obtained biofeedback and the environmental feedback to determine an emotional response of the player; and using the emotional response determined from both the obtained biofeedback and the environmental feedback to suggest an action to undertake that is directed towards the player.

Another aspect provides a system for a gaming environment, the system including: an electronic gaming machine (EGM) present in the gaming environment; at least one biofeedback subsystem coupled to the EGM, and adapted to obtain biofeedback that represents at least one biometric characteristic of a player of EGM; at least one environmental feedback subsystem present in the gaming environment, and adapted to obtain environmental feedback that represents at least one stimulus present in the environment; an emotional processing device coupled to the biofeedback and environmental feedback subsystems, and adapted to process both of the obtained biofeedback and the environmental feedback to determine an emotional response of the player; and a component coupled to the emotional processing device and to the EGM, and adapted to use the emotional response determined from both the obtained biofeedback and the environmental feedback to suggest an action to undertake that is directed towards the player.

Still another aspect provides an article of manufacture that includes a computer-readable medium having computer-readable instructions stored thereon that are executable by a processor to undertake an action in an environment having an electronic gaming machine (EGM) based on an emotional response of a player of the EGM, by: obtaining biofeedback that represents at least one biometric characteristic of a player of the gaming device; obtaining environmental feedback that represents at least one stimulus present in the environment; determining the emotional response of the player from both of the obtained biofeedback and the environmental feedback; and using the emotional response determined from both the obtained biofeedback and the environmental feedback to suggest the action to undertake that is directed towards the player.

Yet another aspect provides a gaming apparatus that includes: at least one biofeedback sensor adapted to provide biofeedback information that represents at least one biometric characteristic of a player; at least one environmental sensor adapted to provide environmental feedback information that represents at least one stimulus present in a surrounding environment; an emotional processing device coupled to said biofeedback and environmental sensors, and adapted to process both of said provided biofeedback and said environmental feedback information to determine an emotional response of said player; and a component coupled to said emotional processing device and to said EGM, and adapted to use said emotional response determined from both said obtained biofeedback and said environmental feedback to change either or both a game parameter or an environmental parameter.

A further aspect provides a method for a player of a game, the method including: obtaining biofeedback that represents at least one biometric characteristic of the player; obtaining environmental feedback that represents at least one stimulus present in an environment where the player is playing the game; processing both of the obtained biofeedback and the environmental feedback to determine an emotional response of the player; and using the emotional response determined from both the obtained biofeedback and the environmental feedback to suggest an action to undertake that is directed towards the player.

BRIEF DESCRIPTION OF THE SEVERAL VIEWS OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 3 shows one embodiment of a system that detects and processes various stimuli that a player is exposed to.

DETAILED DESCRIPTION

Figure 1:
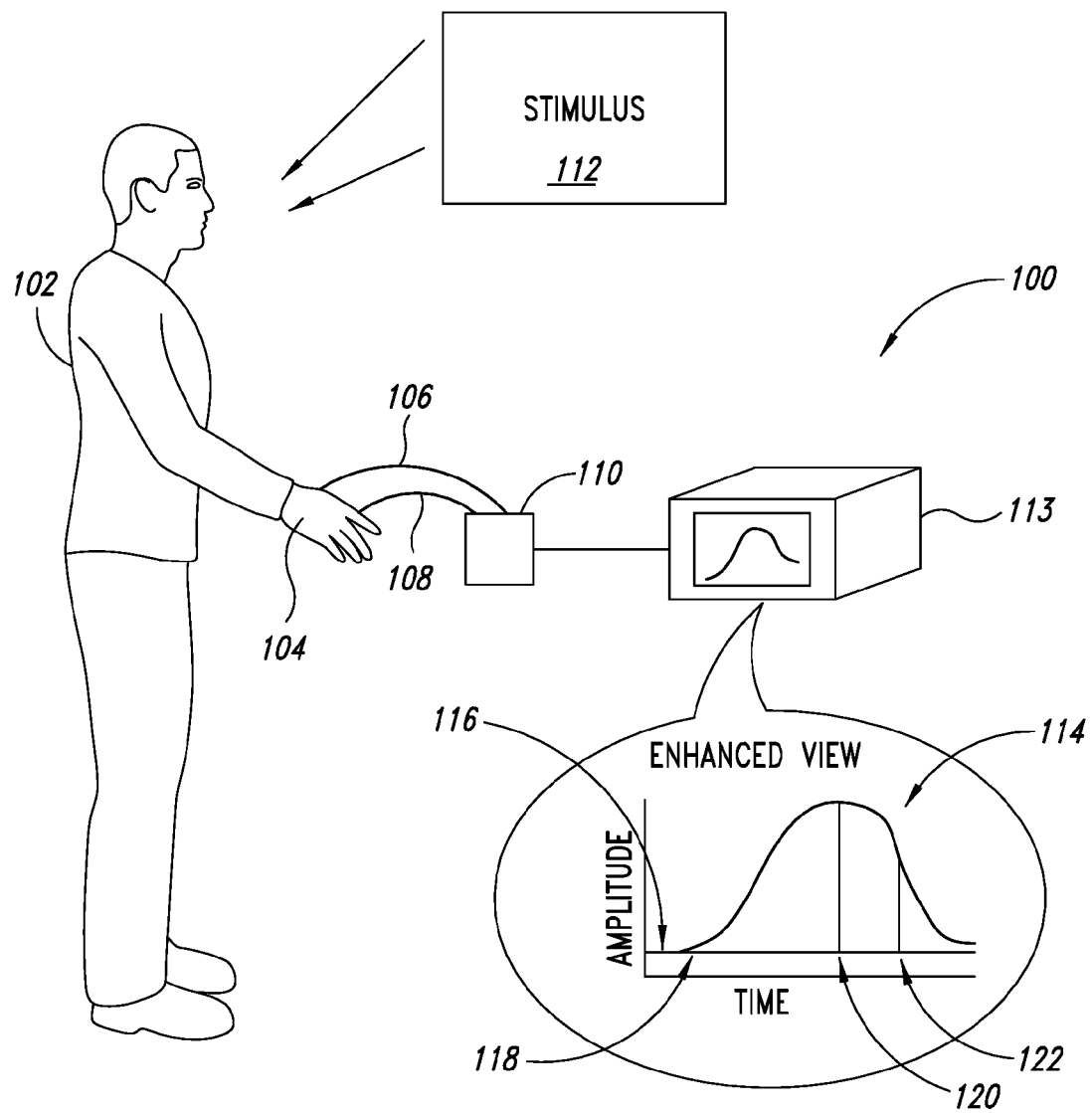
FIG. 1 is a pictorial representation of one embodiment of a Galvanic Skin Response (GSR) subsystem measuring a player's emotional response to a stimulus.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As an overview, embodiments of system and method integrate biometrical feedback (hereinafter referred as "biofeedback") from a player into a game. Other feedback, such as environmental feedback, may be used in conjunction with the biofeedback to make an adjustment to or otherwise change a parameter of a gaming device being played by the player and/or a characteristic of the surrounding environment. The characteristic or parameter of the gaming device that is adjusted can include for example an aspect of the game being played with the gaming device and/or a feature of the gaming device itself. The characteristic of the environment can be any environmental stimuli that may affect the player as the player plays the game.

In accordance with one embodiment, a biofeedback subsystem monitors in real-time at least one biometric characteristic (such as biometric characteristics associated with emotions) of one or more players. The biofeedback is provided to the gaming device and/or related system components, and the gaming device uses the biofeedback to appropriately adjust the game play or other game device parameter to maximize the game's entertainment value to the player(s). In one embodiment, the biofeedback can include a combination of Electrodermal Response (EDR) measurements, facial expression recognition, body expression recognition, optical measurements including pupil and iris behavior and eye tracking, speech recognition, and others.

The player can be identified, for example, through a player card, user identification code, biometric recognition, (e.g., facial recognition, finger print, etc), proximity device (e.g., RFID card, presence sensor, etc), and so forth. One embodiment matches the emotional response of the player (as represented by the biofeedback) with certain game elements that are being presented at that time, and associates this matching to the identified player. One embodiment stores this matching information, combined with any collected environmental feedback, on a game server or player tracking database (or other suitable storage unit) via a network.

In a casino environment, the biofeedback of one embodiment can also be provided to an equipment system device of the casino environment that is communicatively coupled to player tracking databases, security systems, and other casino systems via a network. The equipment system device stores the emotional feedback associated with the game or environmental feedback in the player tracking database. The emotional response and matching environmental feedback can be aggregated in the player database for a per-player or multi-player summarization.

Previous emotional feedback, matching environmental stimuli, and/or summarizations may be requested by the game (such as through the equipment system device) from the game server and/or the player tracking database on the network and may be used to appropriately adjust the parameter of the gaming device and/or environment to maximize the game's entertainment value to the player. The player tracking database can also be mined in one embodiment through the use of data mining and business logic tools to understand player preferences for particular game and/or environmental elements. This information can be aggregated and incorporated into future game design and environmental design (e.g., music, colors, offers, etc).

The biofeedback subsystem of one embodiment is also able to provide certain physical feedback of the player, including but not limited to alcohol level, aggression, etc. With this physical feedback, one embodiment then determines if any subsequent response should be taken (e.g., stop selling drinks to the player, deactivate the gaming device, contact security, etc).

Accordingly, one embodiment is able to recognize when a player is emotionally responding to a game, and this recognition can be associated with the specific elements of the game being presented. The emotion of the player (as indicated by the biofeedback and/or environmental feedback) can be incorporated into the game real-time, and adjustments to the specific or other elements of the game/environment can be made during the course of the game to maximize the entertainment value to the player. In some cases, the elements of the game that are stimulating to the player can be reduced/removed, so as to create anticipation, which also provides entertainment to the player.

By being able to receive the biofeedback feedback, one embodiment enables the future of designs of games to accurately develop and modify specific elements that are found to be entertaining. In traditional game development, this data is collected through focus groups, questionnaires, etc., which is open to significant error through miscommunication and misinterpretation. Further, by maintaining or otherwise storing information (such as in the player tracking database) that indicates which elements stimulated a player and in what manner, one embodiment is able to proactively and strategically incorporate these or similar elements in subsequent gaming sessions on the same or different games, for the same player and/or other players.

By being able to receive the environmental feedback, the effect of other environmental influences (such as alcohol, other people in close proximity, air temperature and quality, sounds, time of day, time on gaming device, etc.) on a player's emotional response to the game can be ascertained. If such environmental influences affect a player's emotional response to certain game elements, one embodiment is able to make adjustments to the game and/or environment to appropriately address the situation.

For example, one embodiment is able to recognize unhealthy, inappropriate, dangerous, undesirable emotions or states of a player, and take or recommend appropriate action proactively. Thus, if a player is becoming increasingly angry (due to the results of a game and/or outside influences), the casino operator can direct a security guard into the play area for further monitoring or investigation. Further, if a player is detected to be approaching the legal alcohol limit, an appropriate action can be taken to send a supervisor to the player, alert the bar tender or cocktail waitress, and/or adjust the player's game experience to be less stimulating (including deactivating the game).

Various embodiments are directed to stationary and mobile electronic gaming machines (EGMs), personal player gaming consoles (e.g., XBOX, Wii, Play Station, etc), online gaming systems and devices, and the like. Examples of EGMs include, but are not limited to, slot machines, pachinko machines, video lottery terminals, video poker terminals, bingo machines, lotto machines, video keno terminals, video roulette terminals, video blackjack terminals, multi-game machines, and so forth. Other non-exhaustive and non-limiting examples of devices that can play games include personal computers, web surfing devices, personal digital assistants (PDA), mobile phones, televisions, cable or satellite set top boxes, etc. The gaming device may incorporate either or both computer-controlled and physical elements.

FIG. 1 shows one embodiment of a biofeedback subsystem 100 adapted to detect emotion from at least one biometric characteristic. The subsystem 100 of FIG. 1 can provide, for example, biofeedback in the form of skin conductance measurements, and various other embodiments can be directed towards facial expression recognition, body expression recognition, speech recognition, muscle tension measurement, brain activity measurement, alcohol level measurements, body temperature measurements, and so forth. Other non-limiting and non-exhaustive examples of biometric data that can be monitored and measured by the biofeedback subsystem 100 and/or other biofeedback subsystems described herein for determining emotion include blood pressure, heart rate, skin electrical conductivity or resistance, eye activity, pupil or iris characteristics, brain waves, muscle tension, facial and body expressions, speech, etc.

One embodiment of the biofeedback subsystem 100 and/or other biofeedback subsystems described herein can be adapted to perform the above-measurements to obtain the biometric data using Galvanic Skin Response (GSR) or Electrodermal Response (EDR), Electromyogram (EMG) for detecting muscle tension, Electroencephalogram (EEG), and/or other techniques. The biofeedback data can also be derived through temperature measurements or through a camera employing facial expression recognition and body posture recognition, referred to herein as Human Expression Recognition (HER).

Example uses of Galvanic Skin Response (GSR) devices have been in the fields of psychoanalysis and lie detection, and the biofeedback example shown in FIG. 1 represents a GSR measurement of an emotional response of a person (such as a player 102) to a stimulus. In one embodiment, the player 102 being measured has his hand 104 in conductive contact with two electrodes 106 and 108. The two electrodes 106 and 108 are coupled by wires to a GSR amplifier of a GSR sensor device 110, thus forming an electrical circuit.

Human skin is a good conductor of electricity, with dry skin having a resistance of about 1 million ohms. Moist skin lowers the resistance, and this skin property is correlated to the fact that as the player 102 is emotionally aroused in response to a stimulus 112, the player 102 will tend to sweat, even if just a little. The GSR device 110 applies a constant, but human-imperceptible, voltage to the skin through the electrodes 106 and 108. Per Ohm's law, resistance (R) equals the voltage (V) divided by the current (I). Conductance (G) is the inverse of resistance (i.e., R=V/I and G=1/R=I/V).

The GSR device 110 measures the current (I) passing through the player's skin, and is thus able to calculate conductance. Using the change in conductance over time, the GSR circuitry 110 is able to measure emotional arousal. A device 113 displaying the measurements and calculations is coupled to the GSR device 110.

In one embodiment, two conductance measurements may be employed by the GSR device 110. The first is a measurement of tonic conductance, which is sometimes referred to as Skin Conductance Level (SCL). SCL is the average conductance level absent any stimuli and is used as a baseline for a particular individual. The second is a measurement of phasic skin conductance, which is sometimes referred to as Skin Conductance Response (SCR). SCR is the conductance changes that occur when exposed to stimuli. Components of a SCR measurement are amplitude, latency, rise time, and half-recovery time. Amplitude is the change in conductance at a given point in time, while the other components are time values. The device 113 is adapted to display a GSR response 114 defined as a period of positive amplitude in response to a stimulus. Latency is the time between the stimulus 116 and the beginning 118 of the increasing amplitude. Rise time is the time from the beginning 118 of the response to the peak 120 of the response defined as the maximum amplitude achieved during the response 114. Half-recovery time is the time between the response peak 120 and a return to half 122 of the amplitude.

In one embodiment, the GSR device 110 and/or related components use latency between a response and various stimuli to determine, assign, estimate, or confirm which stimulus the player 102 is responding to. In another embodiment, the GSR device 110 calculates the impact and level of arousal to the stimulus 112 from the rise time and amplitude of the response 114. In one non-limiting example, a shorter rise time and larger amplitude indicates a significant emotional response to a certain stimulus 112.

Examples of the stimulus 112 include a visual stimulus, an olfactory (smell) stimulus, an auditory (sound) stimulus, a tactile (touch) stimulus, a gustatory (taste) stimulus, and/or a combination of one or more of these stimuli. The stimulus 112 can originate from a gaming device and/or from an environment proximate to the gaming device and the player 102. The GSR response 114 of FIG. 1 is only one type of Electrodermal Response (EDR) and other techniques for measuring EDR in response to the stimulus 112 can be performed by the biofeedback subsystem 100 of FIG. 1.

Figure 2:
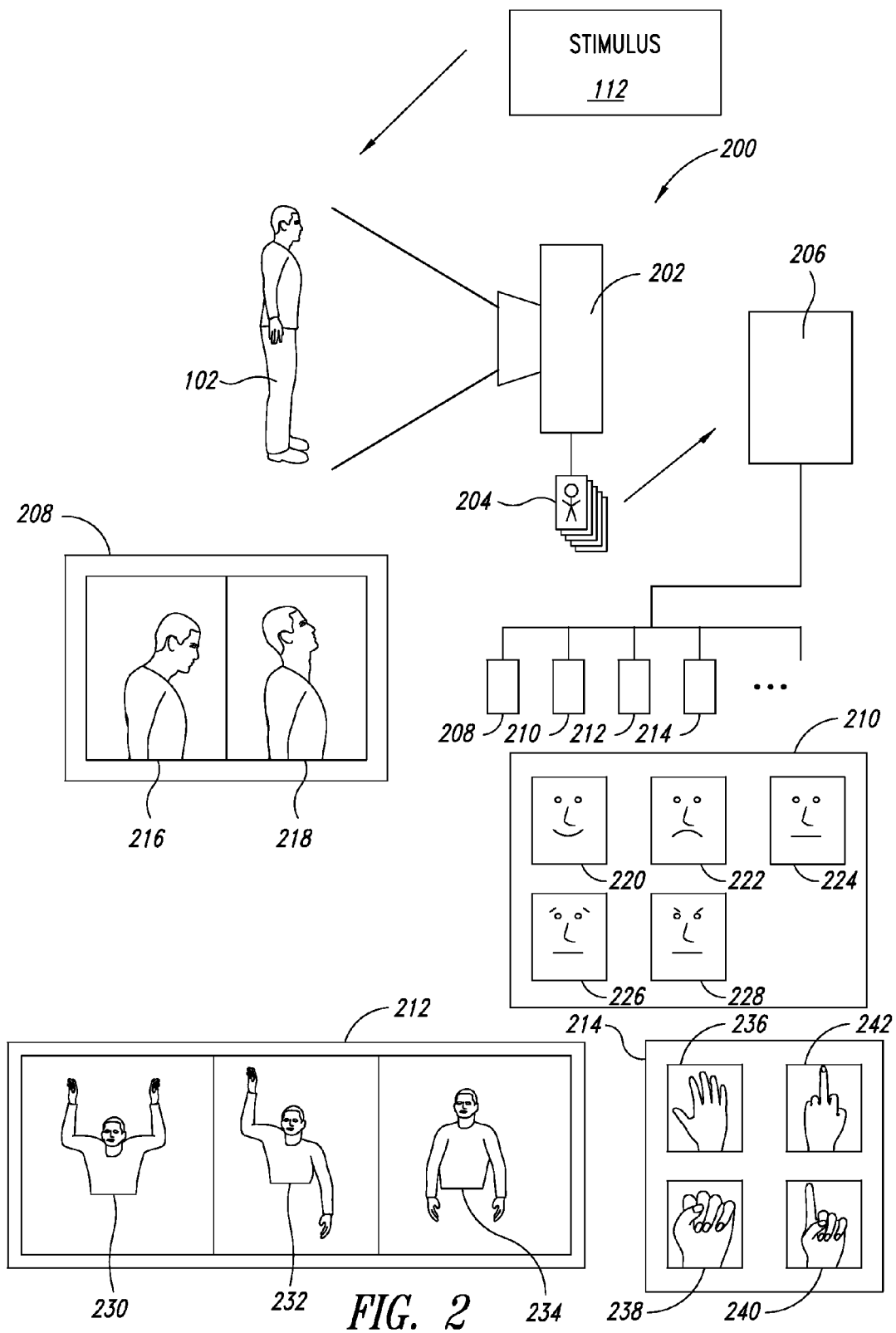
FIG. 2 is pictorial representation of one embodiment of a Human Expression Recognition (HER) subsystem measuring a player's emotional response to a stimulus.

FIG. 2 is a diagram of a Human Expression Recognition (HER) subsystem 200 (which can be considered as a type of biofeedback subsystem in one embodiment) adapted to measure or otherwise determine an emotional response of the player 102 to the stimulus 112. In one embodiment, the HER subsystem 200 includes at least one camera 202 that records a response of the player 102 to the stimulus 112. The camera 202 captures a series of partial or full body images 204 of the player 102, and sends the images 204 to an HER engine 206. In one embodiment, the HER engine 206 receives and assembles images 204 from a plurality of cameras 202.

The HER engine 206 of one embodiment is a software program or other computer-readable instructions that are stored on a computer-readable medium (such as a memory or other hardware storage unit) and executable by one or more processors. The HER engine 206 compares the images 204 against a plurality stored libraries containing various body expression classes (e.g., libraries for body posture expressions 208, facial expressions 210, appendage expressions such as arm expressions 212, and hand expression 214). These various expressions types/classes may be combined in a single library, and in one embodiment, the expressions can described using custom expression semantics, for example in a markup language such as extendible markup language (XML), that identify and describe body elements and expressions for the represented class. Another embodiment describes expressions using stored images and using pattern matching to identify the closest match for the particular expression class.

From the images 204, the HER engine 206 determines the posture of the player 102 by finding the closest match described in the posture library 208. For example, the player 102 can be determined by the HER engine 206 to be slumping forward (from a description 216) or leaning backwards (from a description 218).

Also from the images 204, the HER engine 206 can obtain a plurality of facial elements, such as mouth shape and eyebrow position, and can then match these elements against a plurality of descriptions in the facial expression library 210. For example, the HER engine 206 compares the player's mouth in the images 204 to a smiling description 220, frowning description 222, or neutral description 224. The HER engine 206 can then compares the eye brows in the images 204 to an up slant description 226 or down slant 228. The HER engine 206 can then combine the resulting matches to determine the player's facial expression.

In one embodiment, the HER engine 206 can obtain the player's arm position(s) from the images 204, and can find the closest match described in the arm expression library 212. For example, the images 204 may show that player 102 has his arms in certain positions, and the HER engine 206 can find a match with certain descriptions in the arm expression library: arms raised (description 230), at his side (description 232), or a single arm raised (description 234).

Further in one embodiment, the HER engine 206 can obtain the player's hand expression from the images 204, and can find the closest match described in the hand expression library 214. For example, the player may have his hand open (description 236) or closed (description 238).

In one embodiment, the HER engine 206 and/or another engine describes the player's speech expressions, and can use a speech expression library to determine emotional response of the player. A sound recorder, such as a microphone (which may be integrated in the camera 202), receives sound from the player 102, and sends the sound data to the HER engine 206. The HER engine 206 filters out background noise, and thus retains only sounds emitted from the player 102. In one embodiment, the HER engine 206 can employ voice recognition technologies for identifying which particular sounds are emitted from the identified player 102 (or multiple persons/players). The microphone may be adjusted or placed in such a way to detect only the sounds emitted from the identified player. A non-limiting example is a headset microphone worn by the player 102.

The HER engine 206 of one embodiment can use speech recognition to identify spoken words from the sounds made by the player 102. The words are compared by the HER engine 206 against descriptions in the speech expression library so as to determine the emotional response of the player. This capability allows for the word expression library to be customized based on cultural and/or regional differences in language, dialects, accents, colloquialisms, expressions, etc.

The HER engine 206 of one embodiment can receive non-word sounds emitted by the player 102, and compares these sounds against a sound expression library. Examples of non-word sounds include grunts, groans, moans, screams, silence, deep breaths, signs, etc., all of which can be used by the HER engine 206 to help determine the emotional response of the player 102.

In an alternative embodiment, a separate sound processor filters for sounds from the player(s) and only sends this sound data to the HER (AF30). In still another non-limiting embodiment, the separate sound processor also performs the speech recognition and sends the words and/or non-words to the HER.

The HER engine 206 is adapted to combine the results of a plurality of expression classes to determine the emotional expression of the player in response to an identified stimulus, for example, to determine if the player is happily surprised, disappointed, angry, despondent, excited, celebrating, in deep thought, aroused, etc. As an example, raised arms (description 230) with fists (description 238) and a broad smile (description 220), followed by a quick "We're number one" hand expression (description 240) can be combined to determine that there is an expression of celebration from the player 102. In another example, a slumping posture (description 216) with open hands (description 236), combined with a frown (description 222) and up slanted eye brows (description 226) can be combined to determine that there is an expression of disappointment from the player 102. Rearranging some of these same expressions can be performed to arrive at a completely different emotional response. For example, raised arms (description 230) with open hands (description 236) and a frown (description 222) can still indicate disappointment, but in such a way to indicate that the player 102 is still enjoying the gaming experience.

In one embodiment, any on or more of the expression libraries 208-214 etc. can be adjusted to reflect the local culture. For example, the hand expression library 214 may classify the cultural expression of displaying the lone middle finger (description 242), which is commonly referred to as "the bird" as expressing (in an obscene manner) anger or disgust. Detection of such an emotional expression by the HER engine 206 can enable the casino operator to consider notifying a security guard or casino manager, so as to investigate a situation that may be potentially violent or bothersome for other players. Another example of adjusting the libraries 208-214 etc. can include classifying the displaying lone middle finger as a non-obscene celebratory "We're number one!"

A plurality of cultures may be incorporated into a single library. A plurality of libraries may available to the HER subsystem 200. A single library or plurality of libraries also may be maintained for an individual player/person or arbitrary grouping of individual players/persons.

The libraries 218-214 etc. may be stored and maintained on the local device (such as a gaming device being used by the player 102). Alternatively or additionally, the libraries 208-214 etc. may be stored and maintained at a remote server.

In one embodiment, any one of the libraries 208-214 etc. can be fairly static and maintained by expression developers and updated occasionally. However, updates derived from previous calculations and emotion determinations can be performed. Moreover, any of the contents of the libraries 208-214 etc. can be adapted over time to reflect changing conditions or for other purposes. Further as an example, an emotion can be determined by comparing that player's resulting action against similar historical actions (by this player or others) after expressing a given emotion. The HER engine 206 then calculates an error rate and determines if the plurality of expression results indeed represent a different emotion than that originally calculated/determined. The HER engine 206 can thus perform error correction and "learns" the player's expression.

One embodiment of the HER engine 206 can process multiple persons/players simultaneously. These players can be playing the same game or different games, playing at the same gaming device or different devices, co-located in the same general area or geographically dispersed, and so forth.

Figure 3:
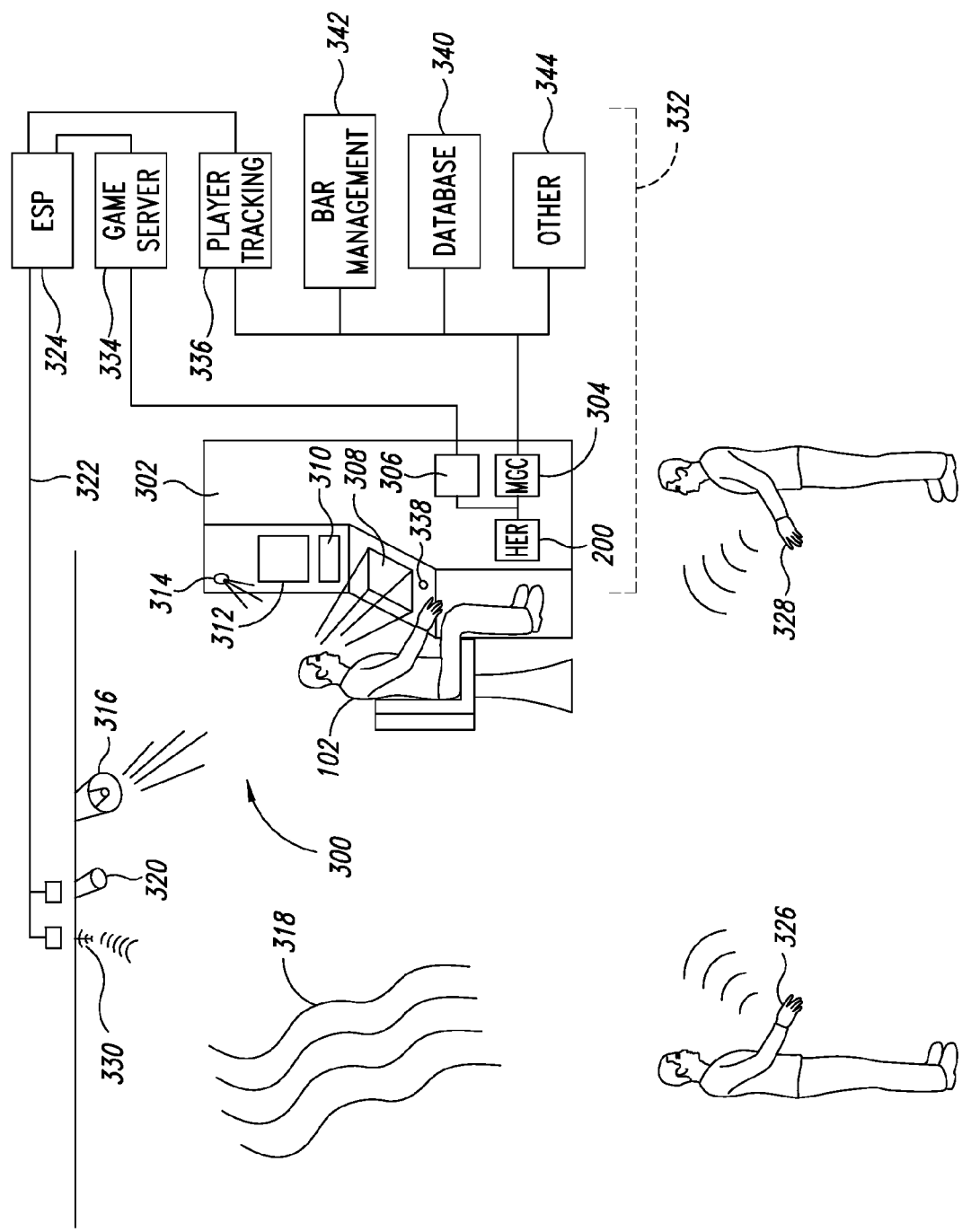

In a given environment, the person 102 is exposed to a plethora of environmental stimuli as well as game stimuli. FIG. 3 is a diagram of example stimuli in a gaming environment, such as a casino or other gaming venue, and how each stimulus is monitored by a system 300 of one embodiment.

In this example, the player 102 is sitting at a gaming cabinet of an EGM 302 and playing a game. In one embodiment, the EGM 302 includes a Master Gaming Controller (MGC) 305, the Human Expression Recognition (HER) subsystem 200, an associated equipment device 306 (like the iVIEW product from Bally Technologies), one or more consoles or displays 308-312, one or more speakers 314, etc. that are coupled together. For the sake of simplicity, FIG. 3 shows the single HER subsystem 200. There may be a plurality of HER subsystems, biofeedback subsystems 100, and/or other biofeedback subsystems present in or otherwise associated with the EGM 302.

The MGC 304 may display the game content on the two displays 308 and 312, while the device 306 displays system content on the small system display 310. The device 306 may share one or more of the displays 308 and 312 with the MGC 304 instead of or in addition to the small system display 310. The MCG 304 and device 306 render sound through the speaker 314.

Various environmental (such as auditory) stimuli are present in the environment of the system 300. Non-limiting and non-exhaustive examples include music from an overhead speaker 316, celebration from players or other audible output from persons at nearby games, general nearby game device sounds, or other general environmental noise 318 generated from people talking, air conditioning or heater units, air filtration system, other gaming machine sounds, alarms, etc. These sound stimuli are detected by one or more sound detection and recording devices 320 (such as a microphone) placed around the environment, including but not limited to, inside the EGM 302 itself. The recording device 320 is coupled to and sends the stimuli data over a network 322 to an Environment Stimulus Processor (ESP) 324. The ESP 324 may also be provided with current song selection information, by the device 320 and/or other source, as the sound stimulus data.

The network 322 can include a wireless and/or wired network, such as an Ethernet connection, serial connection, a USB connection, a local area network, virtual private network (VPN), cellular network, ultra-wide band (UWB) network, WiFi, wireless LAN, Bluetooth, 802.11, RFID, and so forth.

Other people 326 and 328 in close proximity provide environmental stimuli (such as noise and/or their physical presence) to the player 102. Alternatively or additionally to the microphone 320, this environmental stimuli may be detected by the use of proximity devices, such as RFID devices carried by the persons 326-328. The proximity device of person 326 and 328 emits a signal that is received by one or more antennas 330, placed around the environment, including for example, inside the gaming cabinet of the EGM 302 itself. The antenna 330 is coupled to the ESP 324 to enable the ESP 324 to process the proximity stimulus data to the ESP 324 for processing.

The ESP 324 may be located on a server remote from the EGM 302 or may be located in the gaming cabinet of the EGM 302. Examples of the ESP 324 include, but are not limited to, at least one microprocessor, controller, microcontroller, digital signal processor (DSP), and/or other processor. If present in the EGM 302, the ESP 324 can be coupled to or otherwise associated with the MGC 304, the device 306, and/or other components of the EGM 302.

In one embodiment, the ESP 324, the MGC 304, and/or other processors described herein can be coupled to one or more storage units 332 that are adapted to have encoded thereon or otherwise stored thereon software or other computer-readable instructions that are executable by the ESP 324, the MGC 304, and/or other processors to perform processing of biofeedback and environmental feedback and to adjust a parameter of the EGM 302 (and/or other system component) or trigger some other action to undertake, in response to the processed feedback. The storage unit(s) 332 can be embodied by a random access memory (RAM), a read only memory (ROM), or other hardware-based computer-readable storage medium. In one embodiment, elements of the HER subsystem 200, the biofeedback subsystem, and/or other components elements described herein can be embodied as the computer-readable instructions or other information/data stored in the storage unit(s) 332. The storage of such elements in the storage unit 332 and coupling of the storage unit(s) 332 to the processor(s) is represented in FIG. 3 by broken lines.

In one embodiment, environmental stimuli can be processed by the ESP 324 globally, per EGM 302, or per arbitrary groups of EGMs 302, such as those co-located in a similar area. The ESP 324 communicates these stimuli events to the game server 334 and/or player tracking system 336 that are coupled to the ESP 324. The game server 334 and/or player tracking system 336 associates player emotional responses/game element stimuli matches with simultaneous environmental stimuli, such as for storage.

The ESP 324 may send the environmental stimuli to the EGM 302 directly (such as if the ESP 324 is located within the gaming cabinet). The MGC 304 and/or other element of the EGM 302 may associate the emotional response from the emotion monitoring device (e.g., the galvanic skin response provided from the biofeedback subsystem 100, the HER subsystem 200, etc.) with the player 102 and game elements of the EGM 302. If there are multiple ESPs 324, some environmental stimuli may be sent to a remote ESP at the game server 334 and other stimuli may sent to a local ESP 324 in the gaming cabinet of the EGM 302. In one embodiment, some combination of processes are performed for associating environmental stimuli, game element stimuli, and other stimuli that affect emotional response with a player ID at the device 306, MGC 304, game server 334, and/or player tracking system 336.

The player 102 is also influenced by the game itself on the EGM 302, as communicated through the displays 308 and 312 and speakers 314. The MGC 304 is aware of the various game elements being displayed or played through the speakers.

In one embodiment, the MCG 304, device 306, remote game server 334, and/or player tracking system 336 does not capture or record stimuli until triggered by the HER subsystem 200 and/or the biofeedback subsystem 200. This feature enables system performance from being adversely affected by high volume of stimuli that need to be processed. Delaying processing until the HER subsystem 200 and/or biofeedback subsystem 100 recognizes a key emotion limits the performance and storage requirements associated with monitoring, tracking, processing, and storing feedback information. In one embodiment, all or part of the detected stimuli may be stored for later association to player emotions by matching the two (stimulus and emotional response) based on event time, such that changes to the environment and/or EGM 302 can be based on historical trends rather than instantaneous emotional reactions to stimuli.

One embodiment of the ESP 324, the HER subsystem 200, the biofeedback subsystem 100, the MGC 304, and/or other elements of the system 300 may classify stimuli. Non-limiting and non-exhaustive examples of stimuli classifications include game stimuli, sound stimuli, person stimuli, etc. Stimuli classes can also be sub-classified. Two examples of sound sub-classes include music stimuli and noise stimuli. Stimuli classes (and sub-classes) also can have customized attributes. Non-limiting and non-exhaustive examples of types of game stimuli class attributes include certain symbols, graphics, actions (e.g., killing, flying, running, etc.), colors, speed of animations and transitions, style (e.g., flashy versus subdued), subject matter (e.g., animals, people, game show, etc). Non-limiting and non-exhaustive examples of music stimuli class attributes include genre, tempo, beat, performer, etc. Non-limiting and non-exhaustive examples of noise stimuli include volume, duration, specific source (or general noise), and the like. Non-limiting and non-exhaustive examples of person stimuli are employee position (or patron), loyalty club tier (if a patron), known versus unknown player, physical attributes (e.g., gender, hair color, size, race, etc.), and so forth.

The player tracking system 336 and/or game server 334 may store the type of stimulus detection source (e.g., microphone, game, camera), the stimulus type (such as via an assigned identification number), the emotional response type (such as via an assigned identification number), the magnitude of the stimulus (if applicable), identification of the player (such as via an assigned identification number), or other information as one or more records in at least one database 340 or other suitable data structure. The database(s) 340 may be stored in the storage unit(s) 332.

As explained previously, other factors may be taken into account when analyzing the emotional response of the person 102. Examples include time of day, time spent on the EGM 302, caloric intake/burn, environmental and biological temperature, alcohol consumption, and so forth. The time of day can be determined, for example by the ESP 324, through the time provided to and synchronized on the game server 334 by a time server or clock. The time on the EGM 302 can be determined by a slot accounting system communicatively coupled to the ESP 324 and/or other elements of the system 300 of FIG. 3.

As an example of a biofeedback or other type of feedback, alcohol consumption can be used as a factor that can be taken into account when analyzing emotional response of the player 102. In one embodiment, an alcohol detection device (ADD) 338 may be embedded in one or more buttons on the gaming cabinet of the EGM 302. In another embodiment, the ADD 338 may be incorporated into one or more of the displays 308-312 or other component of the EGM 302 in such a way as to determine the alcohol level/consumption of the player 102. As the player touches the ADD 338, his alcohol level is measured, and the ADD 338 sends the data to the device 306, the MGC 304, the biofeedback subsystem 100, the ESP 324, or other component for inclusion along with other biofeedback and/or environmental feedback input.

In one embodiment, the ADD 338 can use near-infrared absorption spectroscopy techniques, such described in "New Booze Busting Device: Engineers Measure Blood Alcohol Content with Spectroscopy," Science Daily, Nov. 1, 2007, to determine blood alcohol level. With this technique, low power light (such as light in the near-infrared spectrum) is introduced into the skin of the person 102 (e.g., skin of the hand, finger, arm, or other body part of the person proximate to the ADD 338). The light that returns to the skin surface is collected by a detector of the ADD 338. Since the light reflected by each type of molecule (e.g., water, alcohol, etc.) is unique, the spectrum of alcohol can be discriminated from other molecules that are present in the body.

Alternatively or additionally, alcohol consumption may estimated by data from a bar management system 342. For example, the bar management system 342 may keep an accounting of the number of drinks that have been ordered by the player 102.

The embodiment of the system 300 may include other components 344, which are not described in further detail herein, for the sake of brevity. Examples of the components 344 can include, but not be limited to, communication devices, other biofeedback and/or environmental feedback subsystems, power supplies, a security system, other servers or processors or storage units, a command and control center (such as game-to-system or G2S components), and so forth.

Figure 4:
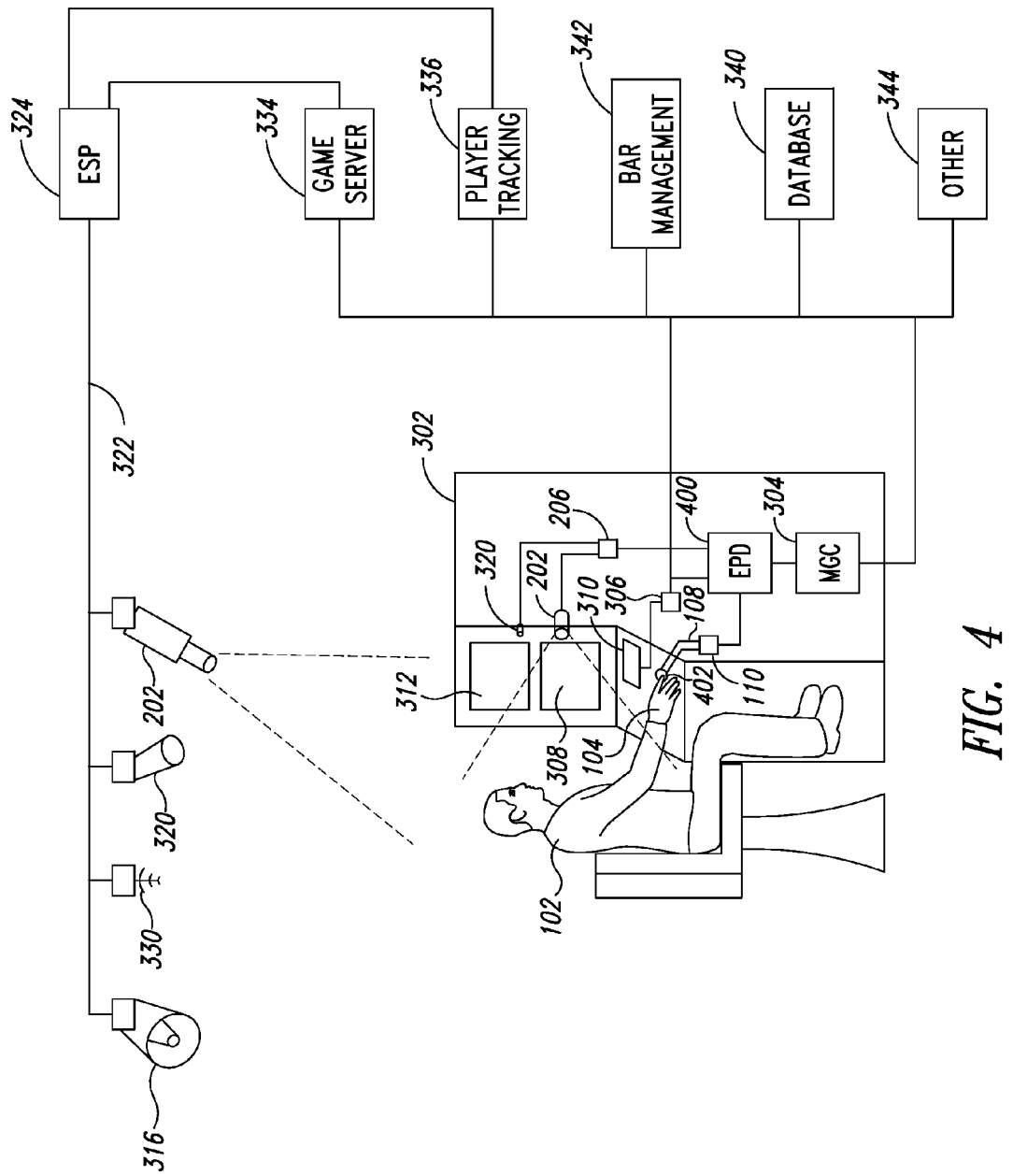
FIG. 4 is a diagram illustrating a plurality of biofeedback and environmental feedback devices on an electronic gaming machine (EGM) according to one embodiment.

FIG. 4 shows in further detail various example embodiments of multiple biofeedback methods that can be employed by the EGM 302. The EGM 302 of one embodiment uses Galvanic Skin Response (GSR) and Human Expression Recognition (HER) methods such as those described above for monitoring the emotion of the player 102. In one embodiment, the GSR device 110 and HER engine 206 are coupled to an emotion processing device (EPD) 400. In another embodiment, the GSR device 110 and/or the HER engine 206 (and their related components) may be combined in the same EPD 400. The EPD 400 is coupled to the MGC 304 and/or the associated equipment system device 306.

Alternatively or additionally to being located on the ceiling (for example), one embodiment of the camera 202 may be housed in the EGM 302 and is coupled to the EPD 400. The camera(s)' field of view includes the player's entire body and/or portion thereof (e.g., face and/or upper body). In another embodiment, the EGM 302 includes multiple cameras 202. The HER engine 206 processes the player's facial and body expressions as described above with respect to FIG. 2, and provides this information to the EPD 400.

In one embodiment, the camera 202 or other imaging device at or near the EGM 302 may be adapted to capture pupil and iris behavior of the player 102 and perform eye tracking. For example, the camera 202 can capture pupil/iris behavior and movement of the player's eyes, such as for example if an item or other stimulus catches the player's attention or interest, surprised him, etc. Items that may catch the player's attention can include, for instance, visual output from the game (or other environmental stimulus from the EGM 302), nearby persons, or other items in the environment that can be seen by the player 302. One embodiment is able to determine the particular stimulus that caused the player's pupil/iris behavior and eye movement, and use this information to determine a course of action to undertake.

For example, the player 102 may be attracted to red-headed women, and the camera 202 can capture his pupil/iris behavior and eye movement directed towards red-headed women (whether live persons in his vicinity, graphically represented in the displays of the EGM 302, etc.). The EPD 400 and/or other component(s) described herein can process this pupil/iris behavior and eye movement provided by the camera 202 to identify the particular stimulus that caused the pupil/iris behavior and eye movement, using techniques such as triangulation or other suitable technique that can correlate the position of the player's eyes with the stimulus source. Once the stimulus source is identified, the MGC 304 and/or other component can suggest an appropriate action to undertake, such as sending a red-headed waitress to provide additional drinks to the player 102, thereby enhancing his enjoyment of the gaming experience.

The camera 202, if separate from the EGM 302 (such as being located on the ceiling), may send the data (captured images) to the ESP 324, via the network 322, for processing. The ESP 324 may send the facial and body descriptions to the EGM 302 (via the game server 336) to enable the local HER subsystem 200 of the EGM 302 to determine and process the images and/or descriptions. This embodiment enables the ESP 324 to send raw data, semi-processed, or fully processed human expression descriptions to the HER engine 206 in the EGM 302.

In another embodiment, a separate HER engine and related components may be included in or otherwise used by the ESP 324 to determine and process the emotional response. Such a HER engine may receive and process the input from the camera 202 on the ceiling, and send data directly to the device 306 and/or the MGC 304.

There may be one camera 202 for each EGM 302, one camera may monitor the space around multiple EGMs 302, more than one camera 202 may monitor the same EGM 302, etc. The camera assignment(s) can be changed on the fly by moving the camera 202, either physically or via remote control. Some of these cameras 202 may also be are shared with the security and surveillance system.

Alternatively or additionally to being located remotely from the EGM 302 (for example, located on the ceiling), the microphone 320 of one embodiment may be housed in the EGM 302 to record nearby sounds (such as sounds emitted by the player 102), and these sounds are provided to the EPD 400, via the HER engine 206 for example. Through techniques such as voice recognition and speech recognition, the HER engine 206 processes the words and other sounds made by the player 102, and provides this input to the EPD 400.

In one embodiment, the EGM 302 employs a plurality of GSR electrodes embedded in buttons 402 that the player 102 touches with his hand 104. The electrodes are coupled to the GSR device 110, which measures the conductance levels in the player's skin as previously described with respect to FIG. 1 above. Non-limiting and non-exhaustive examples of the buttons 402 include Max Bet, Service, Hold, Draw, and Spin. The GSR electrodes and/or other sensor components may also be embedded in one or more touch displays of the EGM 302, in a slot handle used to initiate the spinning of the reels, on a chair of the player 102, and so forth. The biofeedback subsystem 100 may be provided with a plurality of touch point electrodes coupled in single circuit to a single GSR 110. This embodiment allows for multiple biometric measurements (such as skin conductance, pulse, temperature, etc.) on the EGM 302, which may then be provided to the EPD 400.

The EPD 400 receives input from the biometric monitors (e.g., HER, GSR, etc. sensors) and calculates the player's emotional state. The EPD 400 may take into account individual characteristics in evaluating emotional responses. Non-limiting and non-exhaustive examples include cultural, regional, racial, gender, personal, etc. differences. These personalizations may be stored per player or group of players on the remote game server 334 and/or the player tracking system 336. The personal characteristics may be stored and used to select from pre-stored personalizations or modified on the fly.

The EPD 400 of one embodiment sends this information to the device 306 and/or the MGC 304. Either of these devices are adapted to match this emotional state with applicable stimuli, either from the game element, as tracked by the MGC 304, or from any environmental stimuli collected by the camera(s) 202 and microphone(s) 320.

These matches are sent to the remote game server 334 and/or player tracking system 336 by the MGC 304 and/or the device 306. The game server 334 and/or player tracking system 336 receives additional environmental stimuli from the ESP 324. These environmental stimuli are associated with the player emotional response/stimuli matches from the EGM 302, and stored in the game server 334 and/or player tracking system 336.

In one embodiment, the storing of stimulus information, emotional responses and their matches with stimuli, and other information is performed for a variety of purposes that are explained herein. One of these purposes can include, for example, generation of historical information or profile regarding the player 102. By generating the historical information, changes to the EGM 302 and/or environment can for instance be based on historical trends or stabilized data that indicate consistency of the emotional response during the historical trend, rather than being based on instantaneous (and perhaps unreliable) data points.

The embodiments of FIGS. 3-4 have been in the context of the EGM 302 in a gaming environment (such as a casino), with the various example biofeedback subsystem 100, the HER subsystem 200, the ESP 324, the EPD 400, the various sensor devices (e.g., cameras, microphones, electrodes, ADD 338, etc.), and other components being included in or coupled to the EGM 302. Other embodiments can employ the same or similar components in other types of gaming devices and environments.

For example, these various components can be implemented in conjunction with physical games (e.g., manual slot machines, board games, etc.), alternatively or additionally to gaming devices that include computer-controlled elements. As still a further example, these various components can be implemented in a game console, such as those that operate in conjunction with a set top box, personal computer, network connection, television, or other associated devices. For instance, the various biometric and/or environmental sensors can be integrated in a joy stick or user interface of the game console and/or located in a remote device or other location in the environment where the game console and player are present. In another example, the player 102 may be sitting at a non-EGM table or cabinet (such as a traditional black jack or poker table) that may or may not include a MGC 304, displays 308-312, alcohol detection devices 338, speakers 314, or local camera 202, microphone 320, etc. directly coupled or built into the cabinetry. Rather, the biofeedback and/or environmental feedback may be captured through devices in the vicinity such as the overhead camera 202 and microphone 320 of FIG. 3 and/or other monitoring devices. In such cases, the biofeedback subsystem 100, the HER subsystem 200, the ESP 324, the EPD 400, and various other components shown and described with respect to FIGS. 3-4 can be located in the cabinetry or game console itself and/or remotely therefrom (such as at the set top box, remote server, etc.).

Figure 5:
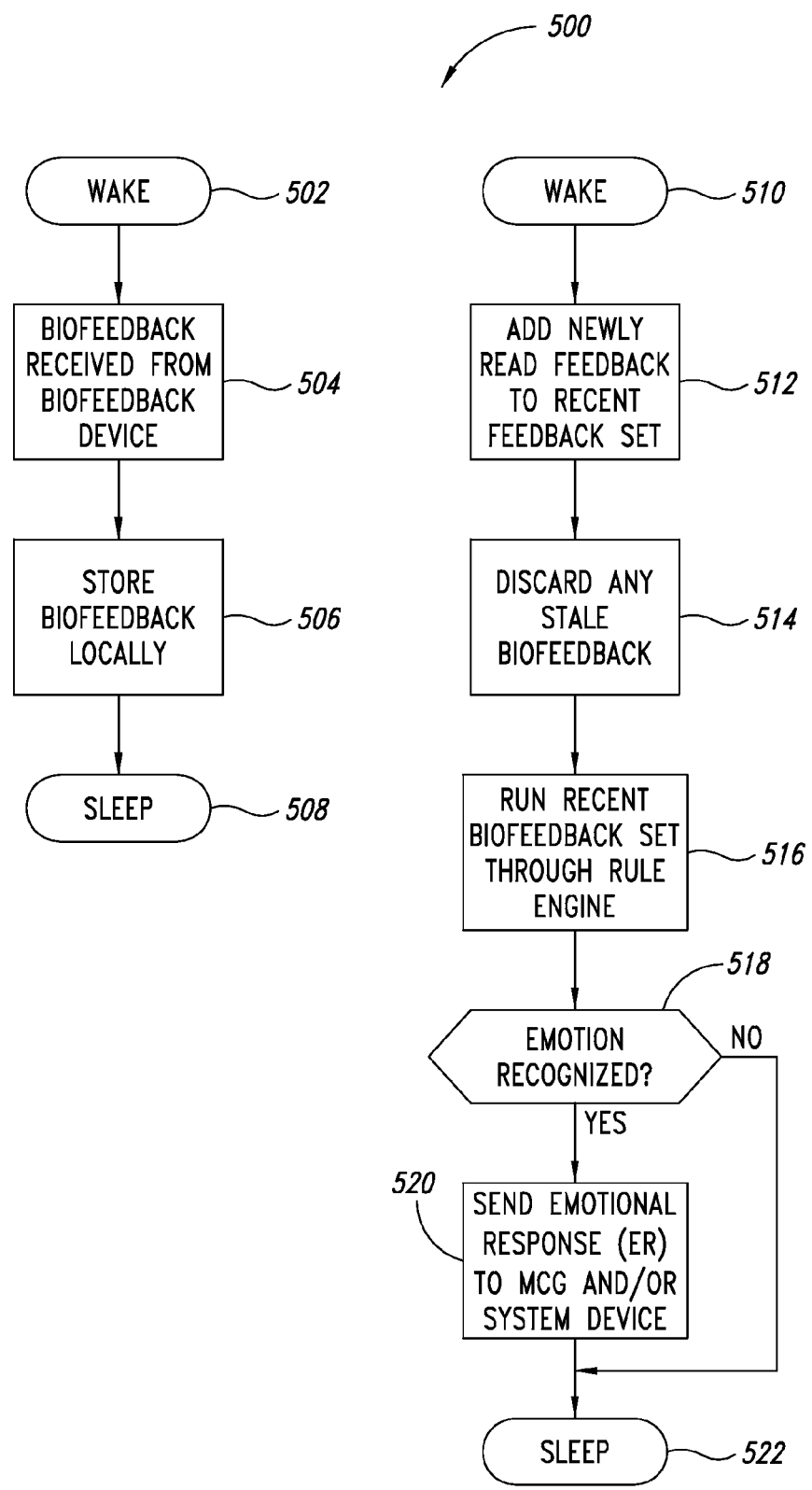
FIG. 5 is a flowchart showing one embodiment of a method performed by an Emotional Processing Device (EPD) to process biofeedback and/or environmental feedback from biometric/environmental monitors.

FIG. 5 is a flowchart describing one embodiment of a method 500 performed by the EPD 400 as it processes biofeedback and/or environmental feedback from a plurality of biometric/environmental monitors (e.g., GSR or HER devices, microphones, ADD 338, etc). Various operations depicted in the flowchart of FIG. 5 and elsewhere herein need not necessarily be performed in the exact order shown. Moreover, certain operations can be added, removed, modified, and/or combined. In one embodiment, the various operations depicted in the flowchart of FIG. 5 and elsewhere herein can be embodied in software or other computer-readable instructions stored on one or more computer-readable storage media and executable by one or more processors, such as previously described above.

In one embodiment, the EPD 400 has multiple concurrent processes running. One or more of these processes are responsible for queuing biofeedback and/or environmental from monitors. The process wakes up at a block 502 when it receives biofeedback and/or environmental feedback data from at least one monitoring device (e.g., biometric sensors such as GSR or HER or EMG or other, environmental sensors, etc.) at a block 504. The process simply saves the feedback locally at a block 506 for later processing, and goes back to sleep at a block 508. In one embodiment, the process stores the data to a queue in RAM or other memory, and separate queues may be maintained for each source of the biometric/environmental feedback.

Meanwhile, EPD 400 has one or more concurrent processes (an EPD evaluation process) that awakens at a block 510 to evaluate the collective biofeedback received. The process reads the newly received feedback that had been locally stored at the block 506 by the other process, and adds to the recent feedback set at a block 512. In one embodiment, the process may look into the queue in RAM without removing the feedback from the queue, or the recent biofeedback set may be de-queued and stored separately in RAM.

In one embodiment, the threshold of what is considered recent is configurable based on the type of biofeedback monitors. In a non-limiting example, a registered spike in heartbeat may be considered stale in a matter of seconds, but a facial expression may not be stale until replaced with a different expression. In one embodiment, the biofeedback or environmental feedback data that is posted to the queue includes an expiration period to provide guidance to the EPD 400 when the biofeedback or environmental feedback should be considered stale and possibly irrelevant.

The EPD evaluation process discards any stale feedback at a block 514. In one embodiment, this discarding may be accomplished by removing the feedback from the queue in RAM, by releasing or erasing the RAM location where the feedback is being stored, or through other techniques.

The EPD evaluation process runs the set of recent feedback through an EPD feedback evaluation rule engine at a block 516. In one embodiment, the evaluation process may combine the described expressions from several biofeedback or environmental monitors to determine if an emotion has been recognized and which one at a block 518. In a non-limiting example, the GSR device 110 interprets a quick spike in stress level and forwards this information to the EPD 400, and around the same time, the HER engine 206 recognizes that the player 102 is no longer grinning and is instead frowning. The EPD feedback evaluation rule engine can thus determine that the player 102 was just surprised with a negative experience.

In another non-limiting example, the GSR device 110 registers a general increase in stress level. The HER engine 206 recognizes that the player 102 is sitting on the edge of his seat, and is leaning towards the game, with a stern and focused facial expression. The speech recognition engine may detect the player 102 saying "Come on, come on. Daddy needs a new pair of shoes." The EPD feedback evaluation rule engine thus decides that the player is greatly anticipating a possible rewarding experience.

In another non-limiting example, the GSR device 110 registers a quick reduction of stress. The HER engine 206 recognizes that the player 102 is tapping his fingers and bobbing his head at a similar rate. It also sees that the player is mouthing words, although the speech engine is not detecting any words, but does detect periodic hums. The EPD feedback evaluation rule engine decides that the player 102 is listening and enjoying a particular song.

If the EPD feedback evaluation rule engine recognizes an emotion at the block 518, then the EPD evaluation process sends the emotional response (an indication thereof) to the MGC 304 and/or the associated device 306 at a block 520 and/or to the same server 334, so as to make an adjustment to a game or environmental element or to take some other action. The EPD evaluation process can go back to sleep at a block 522.

Figure 6:
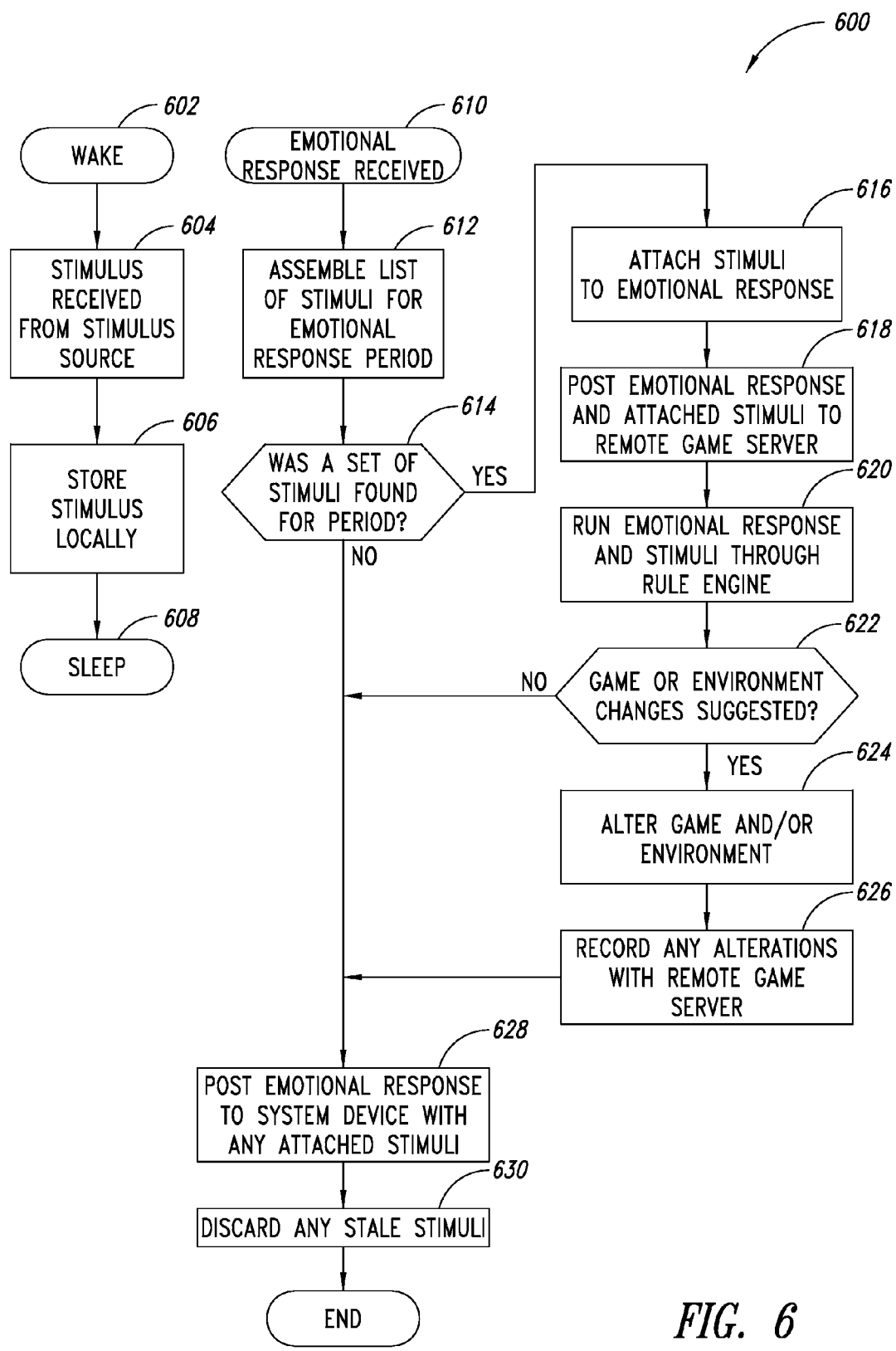
FIG. 6 is a flowchart showing one embodiment of a method performed by a Master Game Controller (MGC) that receives an emotional response from the EPD.

FIG. 6 is a flowchart describing one embodiment of a method 600 performed by the MGC 304 that receives an emotional response (indication thereof) from the EPD 400 and/or the device 302. In one embodiment, the MGC 600 has multiple concurrent processes running. One or more of these processes is responsible for receiving stimuli from stimuli sources. The process wakes up at a block 602 when it receives stimulus data from a stimuli source at a block 604. The process saves the stimulus locally at a block 606, and goes back to sleep at a block 608.

In one embodiment, the MGC local store (at the block 606) includes a sorted list stored in RAM or other memory. The MGC 304 maintains a single sorted list for all stimuli sources and/or can maintain a separate list for each stimuli source.

Non-limiting and non-exhaustive examples of stimuli sources are the game graphics manager (responsible for presenting certain elements to the player), game sound manager (responsible for presenting certain sound elements to the player), game control logic manager (responsible for controlling flow of story line, plot, and other path of game logic execution), and other components for controlling the player game experience.

Environmental stimuli sources provide stimuli data to the MCG 304. Non-limiting and non-exhaustive examples of environmental stimuli sources include a sound recorder recording sound in the general vicinity of the game, light detectors connected directly to the EGM or near the EGM recording lighting characteristics, proximity sensors monitoring objects, including other players and casino employees, passing nearby, the various cameras and microphones and proximity sensors shown in FIGS. 3-4, etc. Furthermore, the ESP 324 can receive and manage stimuli from stimuli sources located around the environment. The ESP 324 records and manages these stimuli, as previously explained above.

In one embodiment, the ADD 338 provides the MGC 304 with the alcohol level of the player 102.

A digital signage system may also inform the MGC 304 of the characteristics of visual messages, graphics, ads, etc. being displayed in the general vicinity, for the environmental stimuli provided at the block 604.

The stimulus source may post the stimulus to a queue with a suggested period of relevancy. For example, a high-action game scene may have a relevancy period of a couple of seconds (possibly the length of the scene), while a song playing on the player's personal listing device may have a relevancy of a few minutes (possibly the length of the song). In one embodiment, a game stimuli manager may be provided to receive and manage the stimuli coming from stimuli sources.

In one embodiment, the MGC 304 creates a process (an emotional response event handler) when the MGC 304 receives notification of an emotional response at a block 610. The provider of the emotional response (e.g., EPD 400 and/or device 302) includes an emotional response period. This emotional response period provides the event handler with guidance on determining the set of stimuli that may be relevant. For example, a surprised emotion may have an emotional response period in fraction of seconds or less than two seconds, whereas a happy emotion may have an emotional response period of possibly a minute.

The event handler queries the local storage for all stimuli that have occurred during the emotional response period, at a block 612. In one embodiment, this is determined by pulling the top stimuli on the sorted list within the requested period of time. The selected stimuli may be recorded in an internal collection, and further, the event handler may query the stimuli sources separately for any applicable stimuli and create an internal collection of stimuli.

The event handler determines at a block 614 if the emotional response coincides with one or more game elements or environmental stimuli. In one embodiment, this is determined by testing for an empty collection.

The event handler attaches the stimuli to the emotional response at a block 616. In one embodiment, the collection is associated with the emotional response, and/or the collection may be actually added to the Emotional Response.

The MGC 304 communicates with the remote game server 334, and the event handler posts the emotional response and attached stimuli to the remote game server 334 at a block 618 for storage or separate processing.

The event handler runs the emotional response and stimuli through an emotional response rule engine at a block 620, and the rule engine applies rules from the rule library (emotional profile) against the emotional response and the stimuli.

The various embodiments of rule engines described herein can be embodied has hardware and/or software logic of the MGC 304, the EPD 404, and/or of other components. For example, the rule engine may reside in the EGM 304 or in a separate regulated component coupled to the MGC 304. The rule engine may reside device 302 or a separate associated equipment component coupled to the device 302, or coupled to the MGC 304 via a regulated and/or unregulated connection, such as serial, Ethernet, etc. In one embodiment, the rule engine may reside on a remote server (such as the game server 334), and the emotional response and attached stimuli may sent to this remote rule engine for processing.

In response to the player's emotional responses, the rule engine determines at a block 622 whether to suggest game and environmental changes. Changing the game may include changing some characteristic of the EGM 302, including changing a parameter of the game and/or changing selected game graphics, including possibly re-skinning the game to graphics or themes to which the player is more likely to a positive emotional response. For example, the system may recognize that the player 102 is feeling that 7s are unlucky and that clovers are lucky. The rule engine can thus suggest replacing 7 symbols with clover symbols.

The rule engine may also, for example, suggest a particular bonus game for the player 102 when he wins a game. One embodiment recognizes which bonus games excites the player 102 most, and can suggest that bonus game.

As still a further example, the rule engine can suggest a logic path or plot for the game. For instance, one embodiment understands the types of plots that really engage the player 102, and can suggest modifications that bring the current play in line with the plot(s). The rule engine may also suggest one or more particular goals that the player 102 may find more engaging, a different reward method for the player, a different level of rewards for the current set of goals, a particular geography for the player to navigate through, increasing the skill level required, and so forth.

As yet a further example, the rule engine may suggest that a nearby player be awarded a prize at such a level that would generate a disruptive celebration on the part of the player playing the other game. This suggestion is based on recognition by one embodiment that the player 102 is motivated and excited by nearby players' winning, and can therefore suggest award level corresponding to other players.

If the MGC 304 is providing a virtual opponent to play against the player 102, one embodiment of the rule engine analyzes the player's emotional responses to assist in the strategy of the virtual opponent. A training application may be provided to teach the player 102 how to control his emotions and/or increase his skill in playing the game against human players. The rule engine may assist a second player in competing against the first, and as such provide a handicapping feature that helps to level the playing field across all players. The suggested level of assistance may be varied for each player.

In one embodiment, the rule engine may suggest making game and/or environmental changes to which the player 102 may have a less positive, or even negative response. In this case and situation, the rules can be provided to help moderate the player's emotional response. One goal may be to prevent the player 102 from being desensitized to certain stimuli due to over-exposure, and/or to de-excite the player 102 for safety reasons, such as for example for detecting and preventing an inebriated player or emotionally unstable person from become over-agitated and posing a safety risk to himself, other players, and/or employees. The rule engine may suggest dispatching an employee, such as a supervisor, manager, or security, to the player 102 for assistance. The MGC 304 or device 302 can communicate a message to the security system and/or other components of a command and control center that an employee needs to investigate this player 102.

In still further examples, the rule engine may suggest that the player 102 move to another EGM (knowing that a friend of the player is sitting nearby), turning off or disabling the game (for example, it is recognized that the player 102 is exhibiting the emotional responses characteristic of addictive gamblers and/or recognizes abnormal play habits for the player during this session), disabling the game if it is recognized from abnormal play habits that the player 102 is inebriated.

The rule engine may provide a plurality of suggestions for a plurality of emotional responses/stimuli at the block 622.

If the emotional response rule engine returns with any game or environmental suggestions at the block 622, the event handler posts one or more recommended changes to the MGC 304 at a block 624. The MGC 304 may implement all the recommended changes at the block 624, or the MGC 304 may recognize that a subset of the recommended changes violates internal game policy, configured operator policy, or configured regulator policy and rejects those suggested changes. Under some circumstances, the MGC 304 may reject all suggestions.

In one embodiment, the MGC 304 is communicating with the remote game server 334, and the event handler records the suggested changes to the game and/or environment and which changes were implemented and which were not at a block 626. The event handler receives the emotional response from the EPD 400, and the event handler posts the emotional response and any attached stimuli to the associated device 302 at a block 628. The event handler may record the emotional response, attached stimuli, changes suggested by the rules engine, which were implement by the MGC 304 and which were not, to the associated device 302.

The event handler cleans up the local store by purging any stale stimuli at a block 630.

In one embodiment, the operations depicted in the method 600 can be performed by other components of the EGM 302, alternatively or in conjunction with the MGC 304. For instance, the device 302 of one embodiment can perform the method 600 alternatively to the MGC 304.

According to various embodiments, saving the emotional responses and stimuli with the remote game server 334 and/or the player tracking system 336 back at the block 618 can be for the purpose of later offline analysis. The emotional response and attached stimuli may be stored in or associated with the player's profile, and/or saved in or associated with a broader set of criteria. Non-limiting examples of such criteria include, but are not limited to, cultural, regional, geographic, racial, nationality, accent, gender, loyalty club tier, and other personal preferences/behaviors. Another embodiment entails storing or associating the emotional response/stimuli grouped based on a mixture the previous characteristics.

In one embodiment, the analysis of the stored information is used to develop a model of a player's preferences and behaviors and what he responds to emotionally. In another embodiment, the analysis is used to develop a broader model of a group of players' preferences and behaviors and what a more general population responds to emotionally. The emotional responses are compared against game stimuli to understand emotional responses to certain game elements. This understanding may then used by game and content designers to modify certain elements of the game in future versions of the game and/or to develop entirely new games.

In one embodiment, a certain stimulus is not analyzed as a source of the emotional response, but rather as an enhancer. The source stimuli may be weighted appropriately against the emotional responses. In a non-limiting example, the biofeedback devices detect a player's normal emotional responses to a particular stimulus, perhaps different cocktail waitresses. From these responses, the rule engine is able draw some conclusions over time about the type of person this player 102 is attracted to. However, when the player has consumed a certain quantity of alcohol, his emotional responses are more intense, enabling the rule engine to draw its conclusions much faster. In another non-limiting example, the player 102 may become emotionally charged during a particular song, increasing his self-confidence and acceptance of risk taking. During this song, his average wager increases twofold in response to certain game elements, indicating an affinity to these game elements. In another non-limiting example, the player 102 may be trending downward in intensity of emotional responses. In this case the rule engine applies time on the EGM 302, overall time spent playing, and/or time of day as a de-enhancer of stimuli and uses that as a determining factor in calculating the impact of other stimuli sources.

In one embodiment, the emotional responses may be compared against music stimuli to understand emotional responses to the type and style of music being played as background music in the facility. This understanding is then used to select play lists to which the players will emotional respond more positively. The understanding may be developed on a group of players, including a single player, for use in developing custom music play lists for a player in that group.

In one embodiment, the emotional responses may be compared against employees in the general vicinity and those that interacted with the player to understand emotional responses to the type of employees. The employees that garner more positive or negative emotional responses can be analyzed for trends. This understanding provides the operator of the casino with data on the employee characteristics to which players respond more positively. Non-limiting examples of characteristics can include physical features (such as hair color, height, race, amount and type of makeup, perfume worn, clothes worn, etc.), personality features (such as talkative versus business-only, loud versus quiet, smiling or not, etc). This understanding may be used to guide hiring decisions, training programs, and cloth selection/policies.

In one embodiment, the emotional responses may be compared against surrounding noise stimuli to understand emotional responses to the general noise of the facility. This understanding can be used to make changes or set policies regarding sound in the facility. In a non-limiting example, the facility has the slot machine volumes set very loud, and players are emotionally agitated by the celebration of a nearby slot machine. The facility operator can thus lower the general volume of the machines. In another example, the volumes are set low. The data shows that players are emotionally charged when they catch the sound of nearby machines. In this case the facility operator increases the volume of the machine. In yet another non-limiting example, an engaging employee is talking over a loudspeaker attempting to generate excitement, possibly performing a play-by-play of a game or announcing or hyping a tournament or other event. The data shows that the players participating in the event respond positively to the excitement, but nearby players not participating find the noise to be disruptive. In this case, once the event has begun, the operator can position the speakers so that the participants receive the intended sounds, but minimize the annoyance in other areas mostly populated by non-participants.

In one embodiment, the emotional responses may be compared against digital signage stimuli to understand emotional responses to the images and advertisements presented to the player. This data and understanding may be sold to third party advertisers and content developers for creating more efficient content. The content may be modified and tailored to specific groups of players. When the player 102 is at the EGM 302, the rule engine can suggest customized content be presented to the player 102 at the game. The understanding of the player's emotional responses to content can be used to customize advertisements played on television channels. The televisions may be in the player's hotel rooms, and the television commercials may be customized for the player when he is watching a particular television station. This targeted advertising based on data collected from emotional response to stimuli can be extended to various media, including, but not limited, internet advertising, movies and other video programming, electronic magazines, etc.

In one embodiment, the emotional responses may be compared against other player proximity stimuli to understand emotional responses to other players. Characteristics of players can be determined that create positive emotional responses in other players. In a non-limiting example, this understanding may be used to create player communities, pulling together players which have common characteristics that they are emotionally attracted to. In another non-limiting example, this understanding may be combined with demographic and emotional understanding to design the gaming facility, or a part of the gaming facility, to attract players with similar tastes and characteristics, thereby assisting in the development of community among players.

In one embodiment, the rule engine may base its suggestions at least in part on some level of randomness, provided by a random number generator. In some embodiments, the rule library in the rule engine may be static and stored locally with the MCG 304. In some embodiments, the rule library in rule engine may be dynamic and customizable based on the situation. In another embodiment, the rule library may be updated based on real-time knowledge learned/derived from previous calculations and emotional responses/stimuli determinations. In a non-limiting example, the conclusions about an emotional response to a particular stimulus may be determined by comparing that player's resulting emotional response to a given stimulus against similar historical responses (by this player or others). The rule engine then calculates an error rate and determines if the plurality of emotional responses indeed signify a different meaning than originally calculated. In this manner, the rule engine performs error correction and learns the player's expression.

In one embodiment, a baseline from which to customize (e.g., learn) may be developed by rule designers. The initial rule library is a single library or emotional profile. From that base, learned knowledge is applied for individual players or groups of players.

The rule library may be developed for each player or group of players. The rule engine engages in a learning period, receiving and analyzing emotional responses/stimuli, but not making any game, system, or environmental suggestions in one embodiment. Rather the rule library may be trained on the player's or group's emotional responses, learning their preferences and behaviors. Once the learning period is over, the rule engine offers suggestions for that player or players in that group. In one non-limiting embodiment, the player is taken through a series of activities to measure his emotional responses to standardized stimuli. The activities may be the same experience for every player, and/or the experience may be differentiated for players. The player may or may not be aware that the system is taking him through a series of exercises in order to learn his preferences and behaviors, perhaps introduced as a way to "get to know him better," for the purpose of developing an emotional profile for him or for a broader emotional profile. This training may take place during normal game play, during a special session, at the game, and/or separately from the game, such as a kiosk, or dedicated training system.

In one embodiment, the customized rule library, or emotional profile, is downloaded (e.g., to the MGC 304 or device 302) when the player 102 is identified, or soon thereafter. In one embodiment, the player may be identified by a player card, by biometric sensor (such as finger print, facial recognition, iris scan, etc.), by a proximity sensor (such as RFID tag on the player's person somewhere), and/or other suitable identification technique.

In one embodiment, the remote game server can incorporate the emotional response and stimuli data received from the MCG 304 at the block 618 with earlier emotional response/stimuli data, and can adjust the rules in the rule library. The updated rule library may be downloaded during a subsequent session. Further in an embodiment, the player tracking system 336 can receive the emotional response/stimuli data from the device 302, performs this analysis of the data, and updates the rule library.

In one embodiment, each player has his own rule library, or emotional profile, as part of his player profile. The rule engine, or emotional profile, may be aggregated and normalized for a particular group of players. Non-limiting examples include cultural, regional, geographic, racial, nationality, accent, loyalty club tier, or other personal preferences/differences/behaviors related groupings. Another embodiment entails grouping based on a mixture the previous characteristics.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

For example, the embodiments described above have provided certain suggested actions to undertake based on the biofeedback and/or environmental feedback. Other examples of suggested courses of action can include, but not be limited to, the following:

- awarding, or increasing the player's odds of his being awarded, a secondary, non-wagering marketing prize, for instance if it is recognized that the player 102 is having bad luck and getting frustrated, and a well-timed prize would assist the player 102 emotionally;
- playing a particular set of songs for the player 102 to listen to during the game, for instance if it is recognized which songs the player 102 emotionally responds to. An embodiment can identify common elements in a set of songs and suggest that the songs be added to the player's music play list and/or rotation;
- provide the player 102 with some other casino offer, such as a free play, free or discounted ticket to the buffet, free or discounted nights stay, free or discounted drink, coupon for shopping, etc.;
- have the bar offer the player 102 his favorite drink, such as if it is recognized that the player 102 is not as excited as he could be, and in fact seems a bit sedate. By knowing the player's favorite drink, one embodiment can suggest that the player 102 be proactively offered his favorite drink;
- if the player has ordered a drink, one embodiment can dispatch a red-headed waitress to serve the drink, if it is recognized that the player 102 is emotionally attracted to red-headed women;
- if the player 102 has ordered a drink, the rule engine may decline and reject the player's order, such as if it is detected that the player 102 is inebriated and getting agitated. The rule engine may suggest dispatching an employee (such as a supervisor, manager, or security) to the player 102 for assistance;
- suggest which advertisements will be most effective for the player 102, such as if the personal preference of the player (e.g., slap stick funny, attractive models, etc) or which products the player responds to are recognized;
- provide stimulating changes based on the player 102 becoming tired, such as if it recognized through biofeedback that the player 102 is tired as a result of time spent on the EGM 302, total time spent playing in the last 24 hours, time of day, etc. The rule engine may suggest providing the player with a stimulating drink (e.g., coffee or a caffeinated soda);

and so forth.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for a gaming device located in an environment, the method comprising:
    obtaining biofeedback that represents at least one biometric characteristic of a player of said gaming device;
    obtaining environmental feedback that represents at least one stimulus present in said environment;
    processing both of said obtained biofeedback and said obtained environmental feedback to determine an emotional response of said player;
    associating the determined emotional response of said player with an event occurrence on the gaming device and the at least one stimulus; and
    responsive to the association of the determined emotional response of said player with the event occurrence on the gaming device and the at least one stimulus, suggesting an action to undertake that is directed towards said player.

2. The method of claim 1 wherein said gaming device includes an electronic gaming machine (EGM).

3. The method of claim 1 wherein suggesting said action to undertake includes suggesting a change in a parameter of said gaming device.

4. The method of claim 1 wherein suggesting said action to undertake includes suggesting a change in a characteristic of said environment.

5. The method of claim 1 wherein said obtaining environmental feedback that represents at least one stimulus present in said environment includes determining one or more of, in said environment: noise, music, temperature, smell, people in proximity to said player, advertisements, air temperature and quality, time of day, time spent on said gaming device, and visual and audible output of said gaming device.

6. The method of claim 1 wherein said obtaining biofeedback includes one or more of determining a galvanic skin response (GSR) of said player, electrodermal response (EDR) of said player, electromyogram (EMG) response to detect muscle tension of said player, and electroencephalogram (EEG) of said player.

7. The method of claim 1 wherein said obtaining biofeedback includes using a human expression recognition (HER) technique to obtain a plurality of images of different body portions of said player and to determine said emotional response from said images of different body portions.

8. The method of claim 1 wherein said obtaining biofeedback includes determining an alcohol consumption of said player using a near-infrared absorption spectroscopy technique.

9. The method of claim 1, further comprising storing said obtained biofeedback and environmental feedback, wherein said processing includes processing said stored biofeedback and environmental feedback to determine said emotional response based on a historical trend, and wherein said action is suggested if said emotional response is determined to be consistent during said historical trend.

10. The method of claim 1, further comprising using said emotional response determined from both said obtained biofeedback and said environmental feedback to determine a design change in said gaming device or to develop a new gaming device.

11. The method of claim 1, further comprising performing training using said emotional response to learn behavior and preferences of said player.

12. The method of claim 1, further comprising:
determining whether said obtained biofeedback and said environmental feedback have become stale; and
repeating said obtaining biofeedback and environmental feedback to determine an updated emotional expression, if said obtained biofeedback and said environmental feedback are determined to have become stale.

13. The method of claim 1, further comprising:
aggregating emotional responses and their matching biofeedback and environmental feedback for a plurality of players; and
generating a profile associated with at least some of said players based on said aggregated emotional responses and their matching biofeedback and environmental feedback.

14. A system for a gaming environment, the system comprising:
an electronic gaming machine (EGM) present in said gaming environment;
at least one biofeedback subsystem coupled to said EGM, and adapted to obtain biofeedback that represents at least one biometric characteristic of a player of said EGM;
at least one environmental feedback subsystem present in said gaming environment, and adapted to obtain environmental feedback that represents at least one stimulus present in said environment;
an emotional processing device coupled to said biofeedback and environmental feedback subsystems, and adapted to process both of said obtained biofeedback and said obtained environmental feedback to determine an emotional response of said player; and
a component coupled to said emotional processing device and to said EGM to associate the determined emotional response of said player with an event occurrence on the gaming device and the at least one stimulus, and responsive to the association of the determined emotional response of said player with the event occurrence on the gaming device and the at least one stimulus, to suggest an action to undertake that is directed towards said player.

15. The system of claim 14 wherein said biofeedback subsystem includes an alcohol detection device adapted to determine an alcohol consumption of said player using a near-infrared absorption spectroscopy technique.

16. The system of claim 14 wherein said component includes a controller of said EGM that is adapted to change, based on said determined emotional response, a parameter of said EGM.

17. The system of claim 14 wherein said component includes a game server coupled to said EGM that is adapted to instruct a change, based on said determined emotional response, a parameter of said EGM and a characteristic of said environment.

18. The system of claim 14 wherein said biofeedback subsystem includes a human expression recognition subsystem adapted to obtain a plurality of images of different body portions of said player and to determine said emotional response from said images of different body portions.

19. The system of claim 14 wherein said environmental feedback subsystem includes an environment stimulus processor coupled to at least one sensor adapted to detect said at least one stimulus.

20. The system of claim 14, further comprising a storage unit coupled to said biofeedback and environmental feedback subsystems and to said emotional processing device, and adapted to store historical biofeedback and environmental feedback information and matching emotional responses that are accessible by said component to determine said emotional response based on said historical information and matching emotional responses, wherein component is adapted to suggest said action to undertake if said emotional response is determined to be consistent during said historical trend.

21. The system of claim 14 wherein said emotional processing device is further adapted to perform training using said emotional response to learn behavior and preferences of said player.

22. The system of claim 14 wherein said emotional processing device is further adapted to determine whether said obtained biofeedback and said environmental feedback have become stale, and if determined to have become stale, is further adapted to respectively obtain new biofeedback and new environmental feedback from said biofeedback subsystem and said environmental feedback subsystem.

23. The system of claim 14, further comprising:
means for aggregating emotional responses and their matching biofeedback and environmental feedback for a plurality of players; and
means for generating a profile associated with at least some of said players based on said aggregated emotional responses and their matching biofeedback and environmental feedback.

24. An article of manufacture, comprising:
a non-transitory, computer-readable medium having computer-readable instructions stored thereon that are executable by a processor to undertake an action in an environment having an electronic gaming machine (EGM) based on an emotional response of a player of said EGM, by:
obtaining biofeedback that represents at least one biometric characteristic of a player of said gaming device;
obtaining environmental feedback that represents at least one stimulus present in said environment;
determining said emotional response of said player from both of said obtained biofeedback and said obtained environmental feedback;
associating the determined emotional response of said player with an event occurrence on the gaming device and the at least one stimulus; and
responsive to the association of the determined emotional response of said player with the event occurrence on the gaming device and the at least one stimulus, suggesting an action to undertake that is directed towards said player.

25. The article of manufacture of claim 24 wherein to obtain biofeedback that represents at least one biometric characteristic of said player, said computer-readable medium includes computer-readable instructions stored thereon that are executable by said processor to undertake said action, by:
determining an alcohol consumption of said player using a near-infrared absorption spectroscopy technique.

26. The article of manufacture of claim 24 wherein to obtain biofeedback that represents at least one biometric characteristic of said player, said computer-readable medium includes computer-readable instructions stored thereon that are executable by said processor to undertake said action, by:

using a human expression recognition (HER) technique to obtain a plurality of images of different body portions of said player and to determine said emotional response from said images of different body portions.

27. The article of manufacture of claim 24 wherein to obtain biofeedback that represents at least one biometric characteristic of said player, said computer-readable medium includes computer-readable instructions stored thereon that are executable by said processor to undertake said action, by:
one or more of determining a galvanic skin response (GSR) of said player, electrodermal response (EDR) of said player, electromyogram (EMG) response to detect muscle tension of said player, and electroencephalogram (EEG) of said player.

28. The article of manufacture of claim 24 wherein said computer-readable medium further includes computer-readable instructions stored thereon that are executable by said processor to undertake said action, by:
storing said obtained biofeedback and environmental feedback, wherein said processing includes processing said stored biofeedback and environmental feedback to determine said emotional response based on a historical trend, and wherein said action is suggested if said emotional response is determined to be consistent during said historical trend.

29. The article of manufacture of claim 24 wherein said computer-readable medium further includes computer-readable instructions stored thereon that are executable by said processor to undertake said action, by:
performing training using said emotional response to learn behavior and preferences of said player.

30. The article of manufacture of claim 24 wherein said computer-readable medium further includes computer-readable instructions stored thereon that are executable by said processor to undertake said action, by:
determining whether said obtained biofeedback and said environmental feedback have become stale; and
repeating said obtaining biofeedback and environmental feedback to determine an updated emotional expression, if said obtained biofeedback and said environmental feedback are determined to have become stale.

31. A gaming apparatus, comprising:
at least one biofeedback sensor adapted to provide biofeedback information that represents at least one biometric characteristic of a player;
at least one environmental sensor adapted to provide environmental feedback information that represents at least one stimulus present in a surrounding environment;
an emotional processing device coupled to said biofeedback and environmental sensors, and adapted to process both of said provided biofeedback and said provided environmental feedback information to determine an emotional response of said player; and
a component coupled to said emotional processing device and to said EGM to associate the determined emotional response of said player with an event occurrence on the gaming device and the at least one stimulus, and responsive to the association of the determined emotional response of said player with the event occurrence on the gaming device and the at least one stimulus, to change either or both a game parameter or an environmental parameter.

32. The apparatus of claim 31 wherein said game parameter includes any one or more of an adjustable: volume, light intensity, skin, prize, difficulty, activation, game speed, color, theme, game type, wager amount, path and level, and required number of players.

33. The apparatus of claim 31 wherein said environmental parameter includes any one or more of: temperature, lighting, noise level, music selection, number of nearby persons, displayed advertisement content, and air quality.

34. The apparatus of claim 31 wherein said at least one biofeedback sensor includes an alcohol detection device adapted to determine an alcohol consumption of said player using a near-infrared absorption spectroscopy technique.

35. The apparatus of claim 31 wherein said at least one biofeedback sensor includes any one or more of: a galvanic skin response (GSR) sensor, electrodermal response (EDR) sensor, electromyogram (EMG) response sensor to detect muscle tension of said player, and electroencephalogram (EEG) sensor.

36. The apparatus of claim 31 wherein said at least one biofeedback sensor includes:
at least one camera adapted to obtain a plurality of images of different body portions of said player; and
a human expression recognition (HER) engine coupled to said at least one camera and adapted to determine said emotional response from said images of different body portions.

37. The apparatus of claim 31 wherein said component includes a controller coupled to visual and audio outputs, and adapted to adjust said outputs in response to said determined emotional response.

38. The apparatus of claim 31 wherein said at least one environmental sensor includes any one or more of: a camera, a microphone, and a proximity sensor.

39. The apparatus of claim 31 wherein said emotional processing device is further adapted to perform training using said emotional response to learn behavior and preferences of said player, and is further adapted to determine whether said obtained biofeedback and said environmental feedback have become stale, and if determined to have become stale, is further adapted to respectively obtain new biofeedback and new environmental feedback from said biofeedback sensor and said environmental sensor.

40. A method for influencing the emotional response of a player of a game, the method comprising:
obtaining biofeedback that represents at least one biometric characteristic of said player;
obtaining environmental feedback that represents at least one stimulus present in an environment where said player is playing said game;
processing both of said obtained biofeedback and said obtained environmental feedback to determine an emotional response of said player;
associating the determined emotional response of said player with an event occurrence on the gaming device and the at least one stimulus; and
responsive to the association of the determined emotional response of said player with the event occurrence on the gaming device and the at least one stimulus, suggesting an action to undertake that is directed towards said player.

41. The method of claim 40 wherein said game includes one of: a game played on an electronic gaming machine (EGM) by said player, a physical game that does not include computer-controlled elements, a game that includes a wager, or a non-wagering game.

42. The method of claim 40 wherein said obtaining biofeedback includes determining an alcohol consumption of said player using a near-infrared absorption spectroscopy technique.

43. The method of claim 40 wherein said obtaining biofeedback and environmental feedback includes using a plurality of sensors remote from said player to obtain said biofeedback and environmental feedback.

44. The method of claim 40 wherein said obtaining biofeedback includes obtaining pupil and iris behavior and eye movement of said player to identify a particular stimulus that caused said pupil and iris behavior and eye movement.

* * * * *